United States Patent [19]
Kang et al.

[11] Patent Number: 5,825,583
[45] Date of Patent: *Oct. 20, 1998

[54] MAGNETIC RECORDING AND REPRODUCING APPARATUS DECK MECHANISM WITH A SLIDE BASE AND A POWER TRANSMISSION MECHANISM RESPECTIVELY DISPOSED ON OPPOSITE SIDE SURFACES OF A FIXED BASE PLATE

[75] Inventors: Myung Goo Kang, Seoul; Seong Sik Kang; Sung Hoon Choi, both of Kyungki-do; Mun Chea Joung, Seoul; Byoung Gyu Jang, Kyungki-do; Kye Yeon Ryu; Hyo Chong Yu, both of Seoul; Sang Jig Lee, Kyungki-do, all of Rep. of Korea

[73] Assignee: Goldstar Co., Ltd., Seoul, Rep. of Korea

[*] Notice: The term of this patent shall not extend beyond the expiration date of Pat. No. 5,608,589.

[21] Appl. No.: 812,918

[22] Filed: Mar. 10, 1997

Related U.S. Application Data

[63] Continuation of Ser. No. 529,577, Sep. 18, 1995, abandoned, which is a continuation of Ser. No. 75,315, Jun. 11, 1993, abandoned.

[30] Foreign Application Priority Data

Jun. 17, 1992 [KR] Rep. of Korea .......................... 10702
Jun. 17, 1992 [KR] Rep. of Korea .......................... 10703
Jun. 17, 1992 [KR] Rep. of Korea .......................... 10704

[51] Int. Cl.$^6$ .................... G11B 15/665; G11B 15/675
[52] U.S. Cl. ...................... 360/85; 360/95; 360/96.6; 242/332; 242/338.4
[58] Field of Search .................... 360/85, 95, 96.6, 360/96.5, 105, 128; 242/332, 338, 338.4

[56] References Cited

U.S. PATENT DOCUMENTS

| | | | |
|---|---|---|---|
| 4,566,047 | 1/1986 | Hirose et al. | 360/95 |
| 4,731,684 | 3/1988 | Suzuki | 360/95 |
| 4,779,153 | 10/1988 | Tsubota | 360/85 |
| 4,868,693 | 9/1989 | Tsutsumi et al. | 360/95 |
| 4,918,551 | 4/1990 | Yoshida et al. | 360/85 |
| 4,949,203 | 8/1990 | Kunimaru et al. | 360/85 |
| 4,970,613 | 11/1990 | Ito | 360/105 |
| 4,985,789 | 1/1991 | Kodama et al. | 360/95 |
| 5,025,332 | 6/1991 | Tsuchida et al. | 360/85 |
| 5,124,854 | 6/1992 | Iyota et al. | 360/96.5 |
| 5,151,832 | 9/1992 | Nagasawa | 360/85 |
| 5,291,351 | 3/1994 | Takita et al. | 360/95 |
| 5,608,589 | 3/1997 | Kang et al. | 360/85 |

FOREIGN PATENT DOCUMENTS 3-134813  6/1991  Japan .................... 360/128

*Primary Examiner*—Craig A. Renner
*Attorney, Agent, or Firm*—Birch, Stewart, Kolasch & Birch, LLP

[57] ABSTRACT

A deck mechanism for a magnetic recording and reproducing apparatus, wherein its fixed base plate and its slide base are slidably coupled to each other without defining a space therebetween. Elements of a tape traveling system are arranged on upper and lower surfaces of the fixed base plate and the upper surface of the slide base. The upper surface of the fixed base plate is mounted with the head drum, a loading motor, a supply slant post assembly, a take-up slant post assembly, a stabilizer, pinch roller arm-driving and pressing mechanisms, a head cleaning mechanism, a capstan shaft of a capstan, all being upwardly protruded from the upper surface of the fixed base plate. The upper surface of the slide base is mounted with a supply reel table, a take-up reel table, a tension adjusting mechanism, and a brake, all being upwardly protruded from the upper surface of the slide base. The lower surface of the fixed base plate is mounted with a power transmission system for the loading motor, a rotor magnet of a capstan motor, an idler mechanism, and a mode sensing mechanism. The deck mechanism of the present invention can be reduced in volume, total height and in number of elements used. As a result, it is possible to provide products with light, thin, simple and compact construction and reduce the manufacture cost.

13 Claims, 26 Drawing Sheets

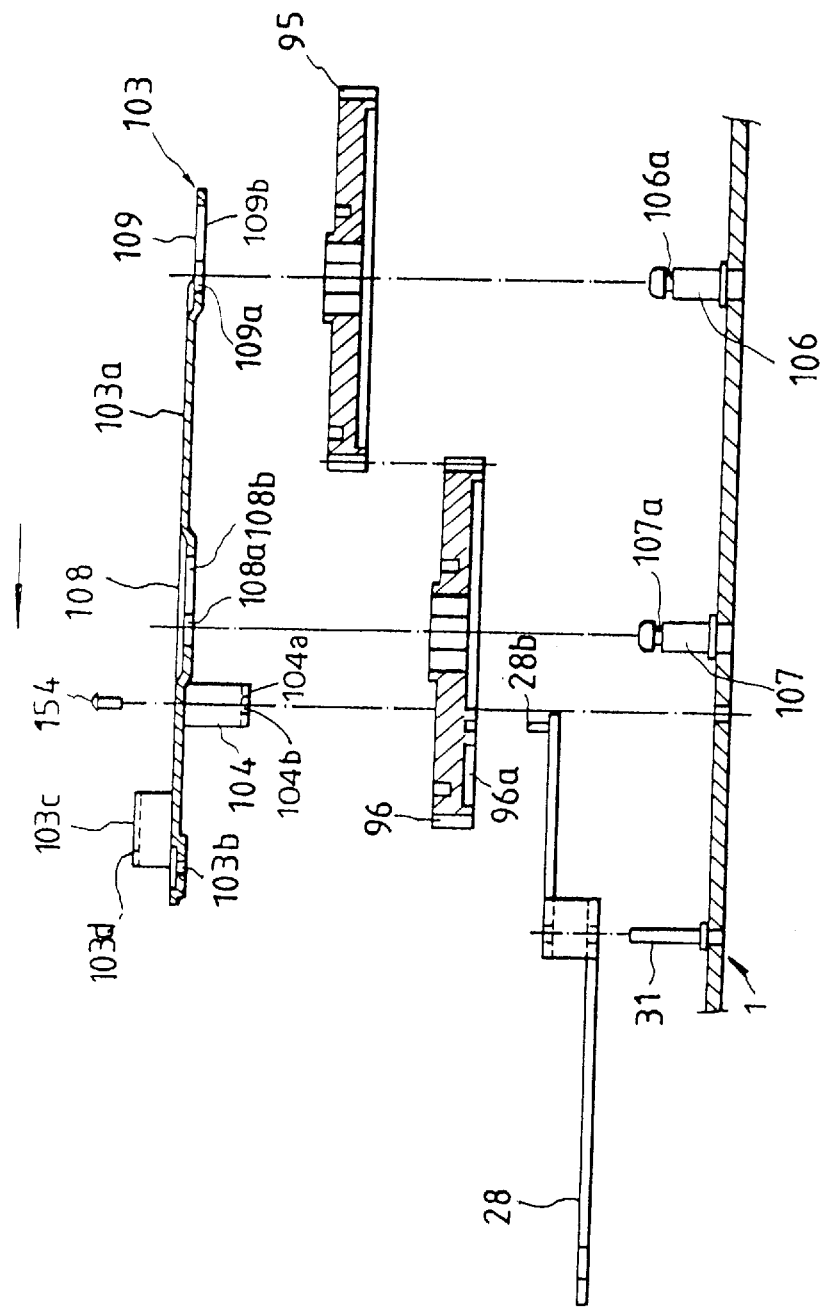

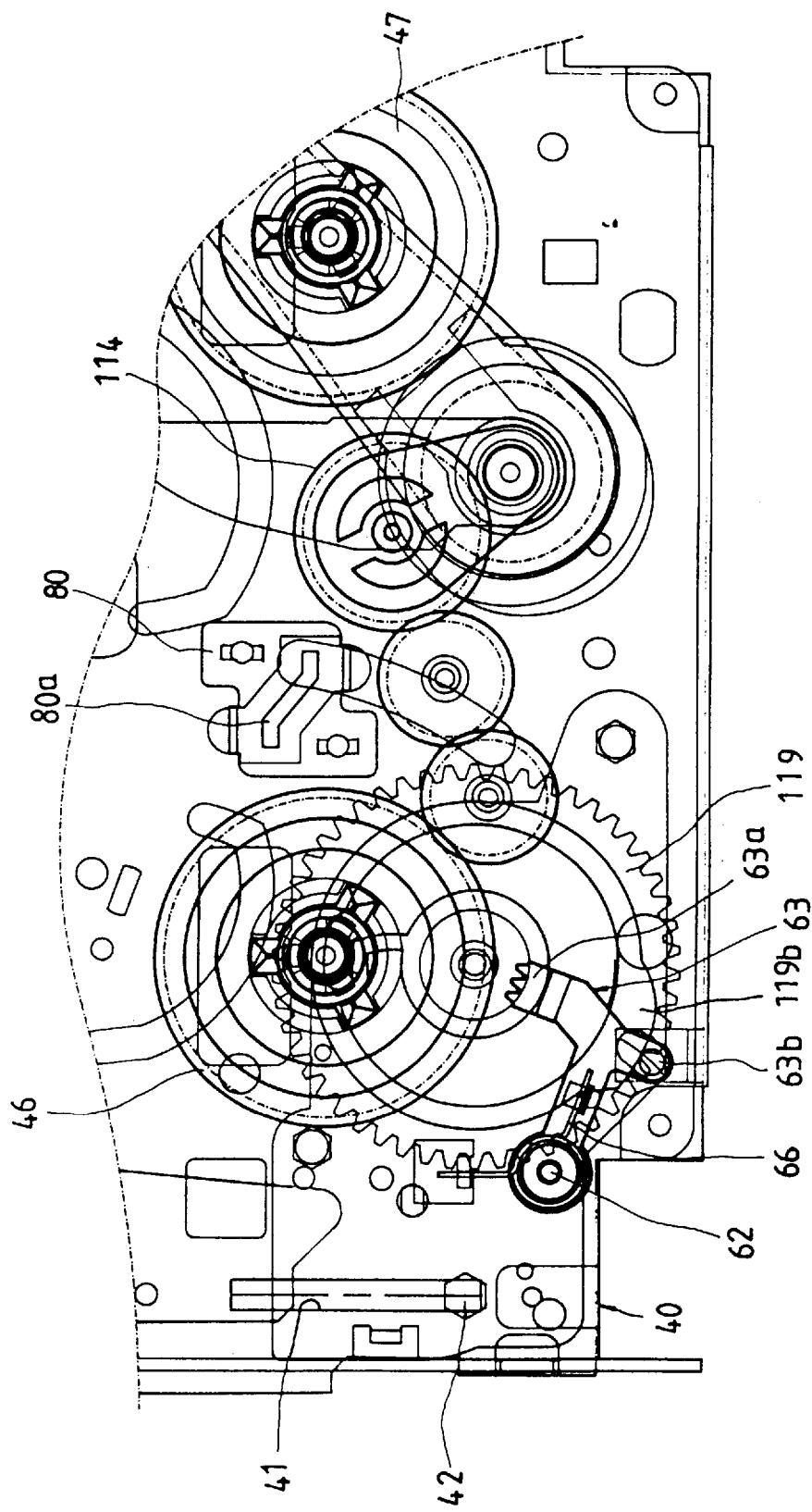

MAGNETIC RECORDING AND REPRODUCING APPARATUS DECK MECHANISM WITH A SLIDE BASE AND A POWER TRANSMISSION MECHANISM RESPECTIVELY DISPOSED ON OPPOSITE SIDE SURFACES OF A FIXED BASE PLATE

This application is a continuation of application Ser. No. 08/529,577 filed on Sep. 18, 1995, now abandoned, which is a Rule 62 Continuation of Ser. No. 08/075,315 filed on Jun. 11, 1993, now abandoned.

BACKGROUND OF THE INVENTION

1. Field of the Invention

The present invention relates to a deck mechanism for a magnetic recording and reproducing apparatus, and more particularly to a deck mechanism constituting a tape travelling system in a slide loading type camcorder.

2. Description of the Prior Art

For conventional magnetic recording and reproducing apparatus such as camcorders, various deck mechanisms of the slide loading type wherein a slide base supporting reel tables thereon slides with respect to a fixed base plate, to load a cassette tape.

As is well-known, a camcorder comprises a deck chassis, namely, a base plate, a rotary head drum for recording video and voice signals on a tape of a tape cassette and playing back the video and audio signals from the tape, an audio head for recording an audio signal on the tape and playing back the audio signal from the tape, a reel table for supporting the tape cassette, to cause the tape to travel, a cassette housing for loading the tape cassette on the reel table, slant post assemblies for taking the tape out of the tape cassette and making it come into contact with the head drum, tape loading means including loading gears operatively connected with respective slant post assemblies and a loading motor for rotating the loading gears, tape travel guide means including a plurality of guide rollers and guide posts for guiding the tape to travel a predetermined path, tape travelling means including a capstan and a pinch roller, tension adjusting means for keeping a constant tension of the travelling tape, travel stabilizing means for keeping a stable travel of the tape, an idler mechanism for rotating the supply and take-up reel tables, to take up the tape fed by the capstan and pinch roller, various brake means for controlling the rotations of supply and take-up reel tables, and sensing means for sensing various mode conversions.

In camcorders with a complex construction constituted by a number of elements, their volumes and weights are determined by the arrangements of the associated constituting elements on base plates. By the arrangements, the performances of camcorders are also determined.

Although functions of elements are important to the performance of the product, the overall arrangement and construction are important factors for determining the compactness, the thinness and the lightness of the product. They also impact greatly on the manufacture cost. However, the conventional slide loading type deck mechanism is difficult to control spaces, since a number of elements for travelling a tape are arranged only above the fixed base plate, and particularly since the fixed base plate and the slide base are coupled to each other defining a space therebetween and elements of tape travelling system are arranged in the space. As a result, the height and volume of the product become larger, thereby making it impossible to provide products which are light, thin, simple and compact in construction. There is also a disadvantage of an increase in manufacture cost.

In the conventional deck mechanism, a pair of loading gears are rotatably mounted on central shafts fixed to the fixed base plate, respectively. Washers are fitted around respective upper ends of central shafts, so as to prevent the loading gears from being upwardly separated. A separate construction should also be provided for preventing a separation of the rotor magnet of the capstan motor due to an impact.

Since a pair of elongated loading guide holes are formed at opposite side portions of the fixed base plate, respectively, by a cutting work, the strength of fixed base plate is reduced. A separate separation-preventing washer is fitted around a cam lever-supporting pin, so as to rotatably support a cam lever for driving the pinch roller.

As a result, the conventional deck mechanism requires the increased number of elements for assembling the loading gears, the capstan motor and the cam lever, thereby degrading the workability in assembling.

SUMMARY OF THE INVENTION

Therefore, the present invention has been made in view of the above-mentioned disadvantages encountered in the prior art and an object of the invention is to provide a deck mechanism for a magnetic recording and reproducing apparatus, which is light, thin, simple and compact in construction and inexpensive in cost.

Another object of the invention is to provide a deck mechanism for a magnetic recording and reproducing apparatus, including a multi-function cam cover plate capable of supporting loading gears, preventing a separation of a capstan motor, reinforcing a fixed base plate, and preventing a separation of a pinch roller-driving cam lever.

Another object of the invention is to provide a deck mechanism for a magnetic recording and reproducing apparatus, including a sensing mechanism with a simple construction capable of making its assembly easy, wherein various sensors such as an end sensor for detecting the ends of tape and a dew sensor for sensing the degree of dewing in the interior of the deck are attached to a printed circuit board and electrically connected with one another and the printed circuit board is mounted on the fixed base plate.

In order to accomplish the objects, the present invention provides a deck mechanism for a magnetic recording and reproducing apparatus which record video and audio signals on a tape and reproduce them while making the tape come into contact with a rotation head drum and travelling the tape along a tape travelling path defined by elements of a tape travelling system, comprising: a fixed base plate fixedly mounted to a body case of the apparatus, the fixed base plate having upper and lower surfaces on which various functional elements are arranged; and a slide base slidably mounted on the fixed base plate, to move rectilinearly between a tape cassette-ejecting position and a tape loading-ending position, the slide base being in contact with the fixed base plate such that no space is defined therebetween.

In accordance with the present invention, the upper surface of the fixed base plate is mounted with the head drum, a loading motor, a supply slant post assembly, a take-up slant post assembly, a stabilizer, pinch roller arm-driving and pressing means, head cleaning means, a capstan shaft of a capstan, all being upwardly protruded from the upper surface of the fixed base plate. The upper surface of the slide base is mounted with a supply reel table, a take-up reel table, tension adjusting means, and brake means, all being upwardly protruded from the upper surface of the slide base. The lower surface of the fixed base plate is mounted with a power transmission system for the loading motor, a rotor magnet of a capstan motor, an idler mechanism, and mode sensing means.

In accordance with the present invention, the fixed base plate is also mounted with a printed circuit board including a light emitting sensor and a pair of light receiving sensors for sensing opposite ends of the tape wound around the supply and take-up reel tables, a pair of reel sensors for sensing rotations of the supply and take-up reel tables and a dew sensor and is also mounted with a flexible printed circuit board electrically connected to the printed circuit board, for a transmission of signals.

BRIEF DESCRIPTION OF THE DRAWINGS

Other objects and aspects of the invention will become apparent from the following description of embodiments with reference to the accompanying drawings in which:

FIGS. 1 to 22 illustrate a deck mechanism for a magnetic recording and reproducing apparatus according to the present invention, wherein FIGS. 1 to 4 show the deck mechanism from which a pivotal cassette housing is removed, FIG. 1 is a plan view showing a state before a tape loading operation, FIG. 2B is an exploded sectional view showing a cam cover plate assembled to the deck mechanism, FIG. 3 is a plan view showing a state after the tape loading operation, and FIG. 4 is a bottom view showing the state after the tape loading operation under a condition that a slide base is removed;

FIG. 5 is a plan view showing the deck mechanism to which the pivotal cassette housing for supporting a tape cassette is coupled;

FIGS. 6 to 9 show the cassette housing,

FIG. 6 is a left side view showing a state before a cassette loading operation,

FIG. 7 is a left side view showing a state after the cassette loading operation, FIG. 8 is a right side view showing the state before the cassette loading operation, and FIG. 9 is a right side view showing the state after the cassette loading operation;

FIG. 10 is a perspective view showing pinch roller arm driving and pressing means of the deck mechanism;

FIG. 11 is an enlarged plan view showing an idler mechanism for driving supply and take-up reel tables of the deck mechanism;

FIG. 12A shows a state before the tape loading operation is initiated, FIG. 12B shows a state that a cleaning roller of the head cleaning means is in contact with a rotation head drum, for cleaning the head drum, as an extension of a slide base actuates a cleaning lever of the head cleaning means after the tape loading operation is initiated, and FIG. 12C shows a state that the cleaning roller is spaced away from the head drum as the extension of the slide base makes the cleaning lever pivot at the end stage of the tape loading operation;

FIG. 13A shows a state after the tape loading operation, and FIG. 13B shows a tape tension function when the tape loading operation is completed;

FIG. 14 is a partial enlarged view showing supply reel brake means of the deck mechanism;

FIG. 15 is a partial enlarged view showing take-up reel brake means of the deck mechanism;

FIG. 17 is an enlarged sectional view showing support pins for a tape cassette;

FIG. 19 is a perspective view showing a gear housing of the deck mechanism;

FIG. 20 is a sectional view showing the supply and take-up reel tables and the idler mechanism of the deck mechanism;

FIG. 21 is a plan view showing sensing means for sensing various operations; and FIG. 22 is a diagram explaining operations of the deck mechanism from the start of the cassette loading mode to the start of the playback mode.

DETAILED DESCRIPTION OF THE PREFERRED EMBODIMENTS

Figure 1:
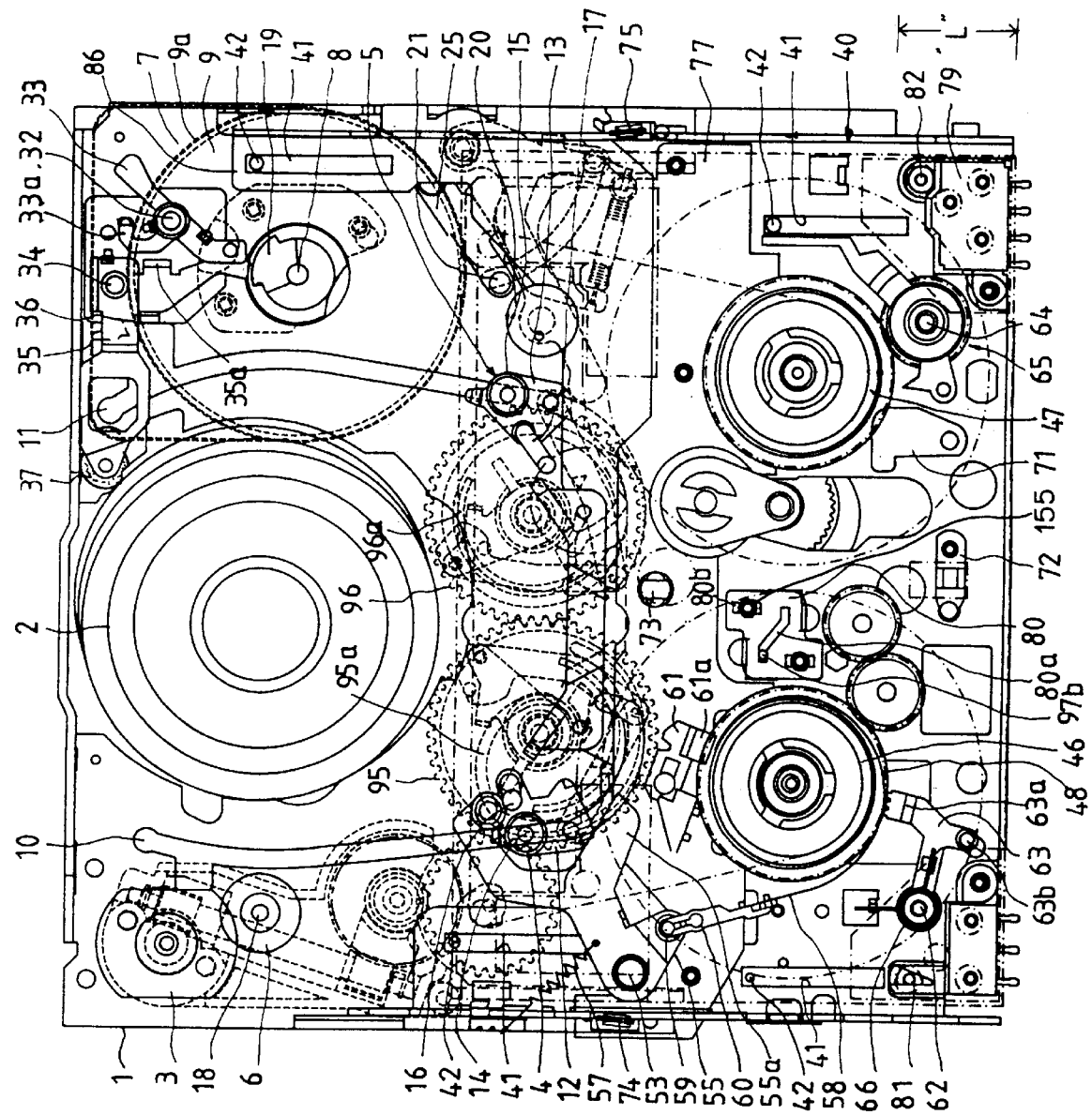

Referring to the drawings, there is illustrated a deck mechanism of a slide loading type magnetic recording and reproducing apparatus in accordance with the present invention.

Figure 5:
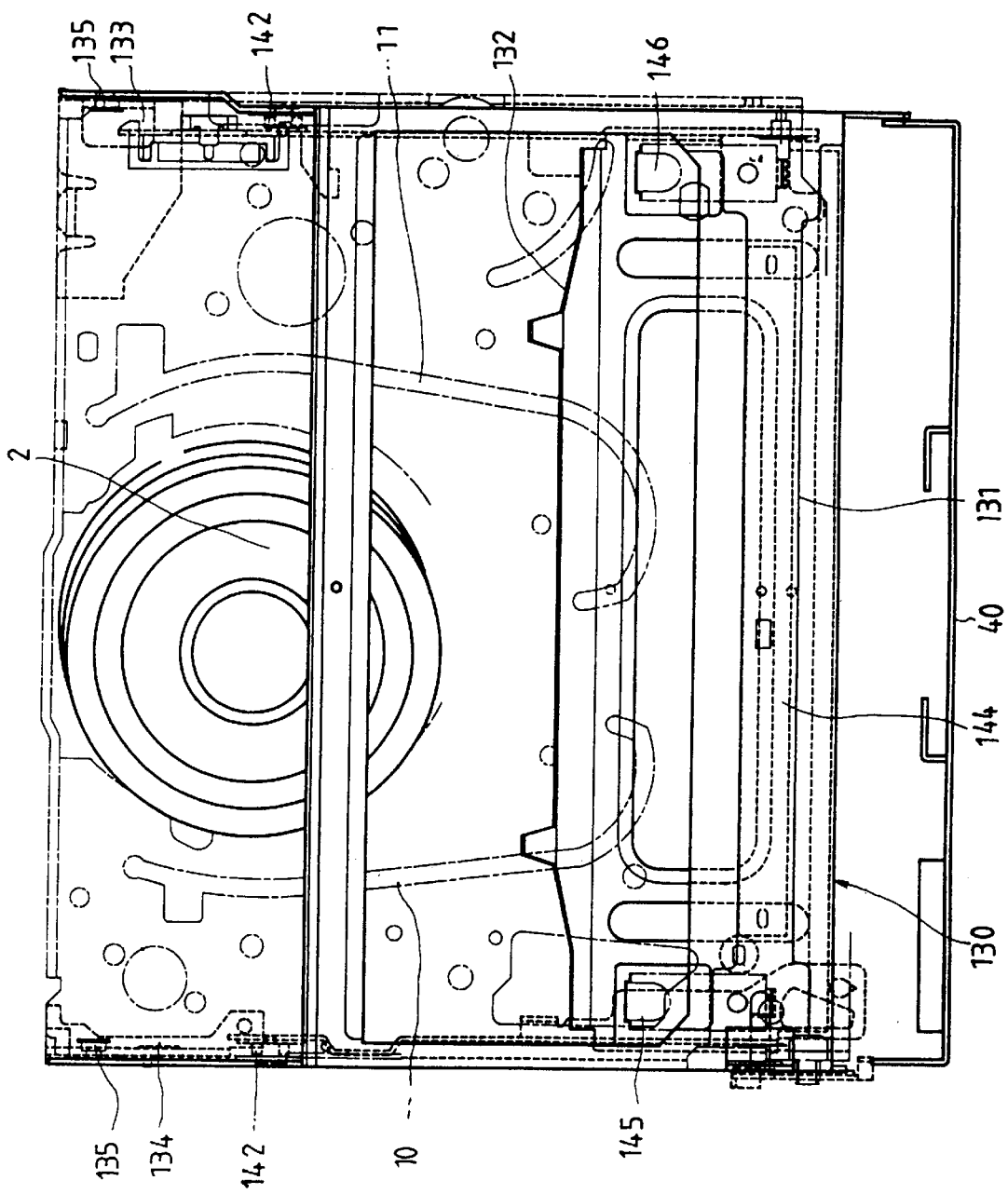
Figure 8:
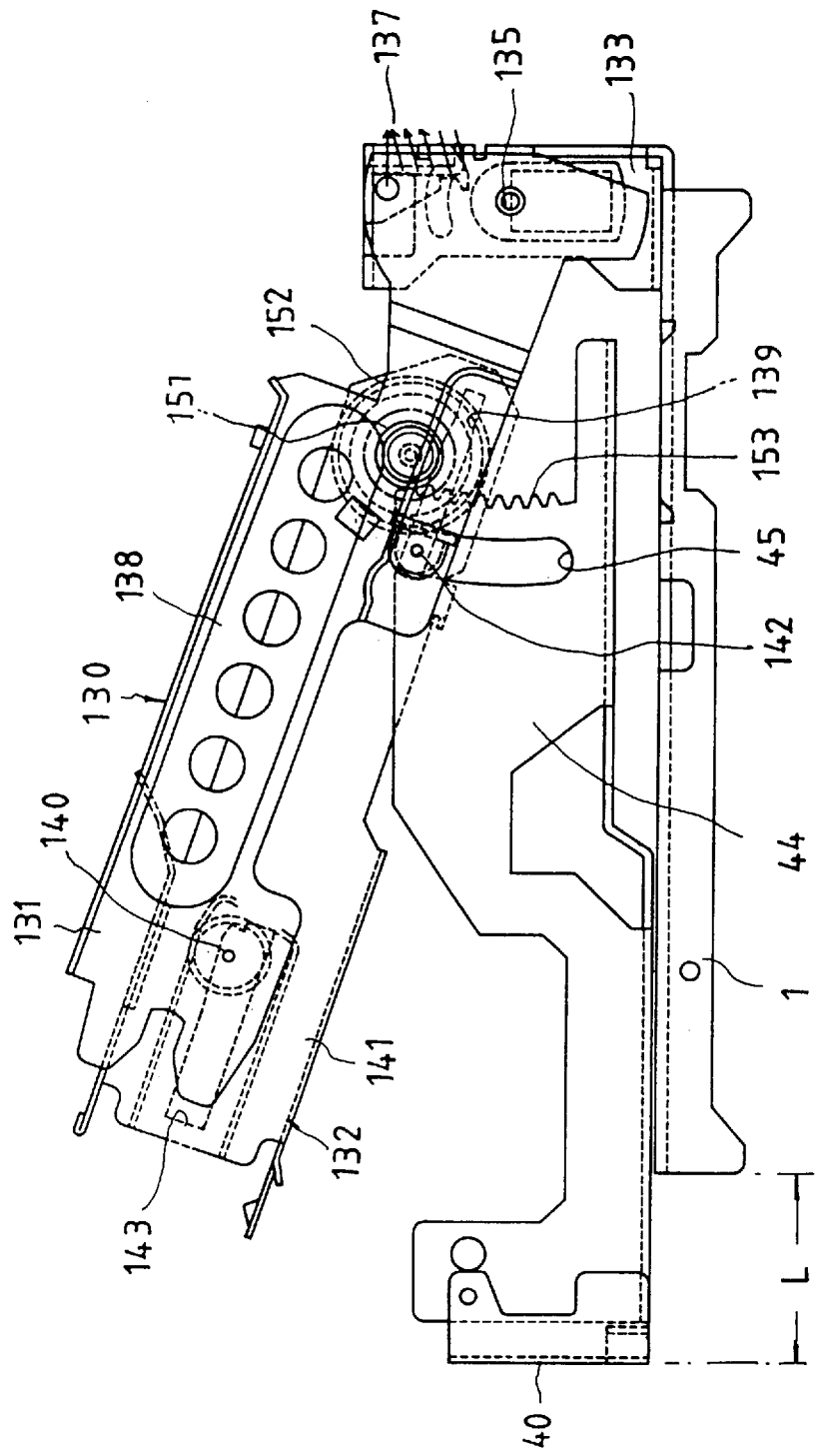

As shown in FIGS. 1, 5 and 8, the deck mechanism comprises a fixed base plate 1 fixedly mounted to a body of the magnetic recording and reproducing apparatus, a slide base 40 coupled to the fixed base plate 1, to move forwardly and rearwardly, namely, longitudinally on the fixed base plate 1, and a pivotal cassette housing 130 (FIGS. 5 and 8) coupled to the fixed base plate 1, to pivot between its opening position and its closing position.

FIGS. 1 and 8 show a state of the slide base 40 coupled to the fixed base plate 1, prior to a tape loading operation. At this time, the slide base 40 is positioned as having been protruded forwardly of the fixed base plate 1 when viewed in FIG. 1, by the length L.

Figure 3:
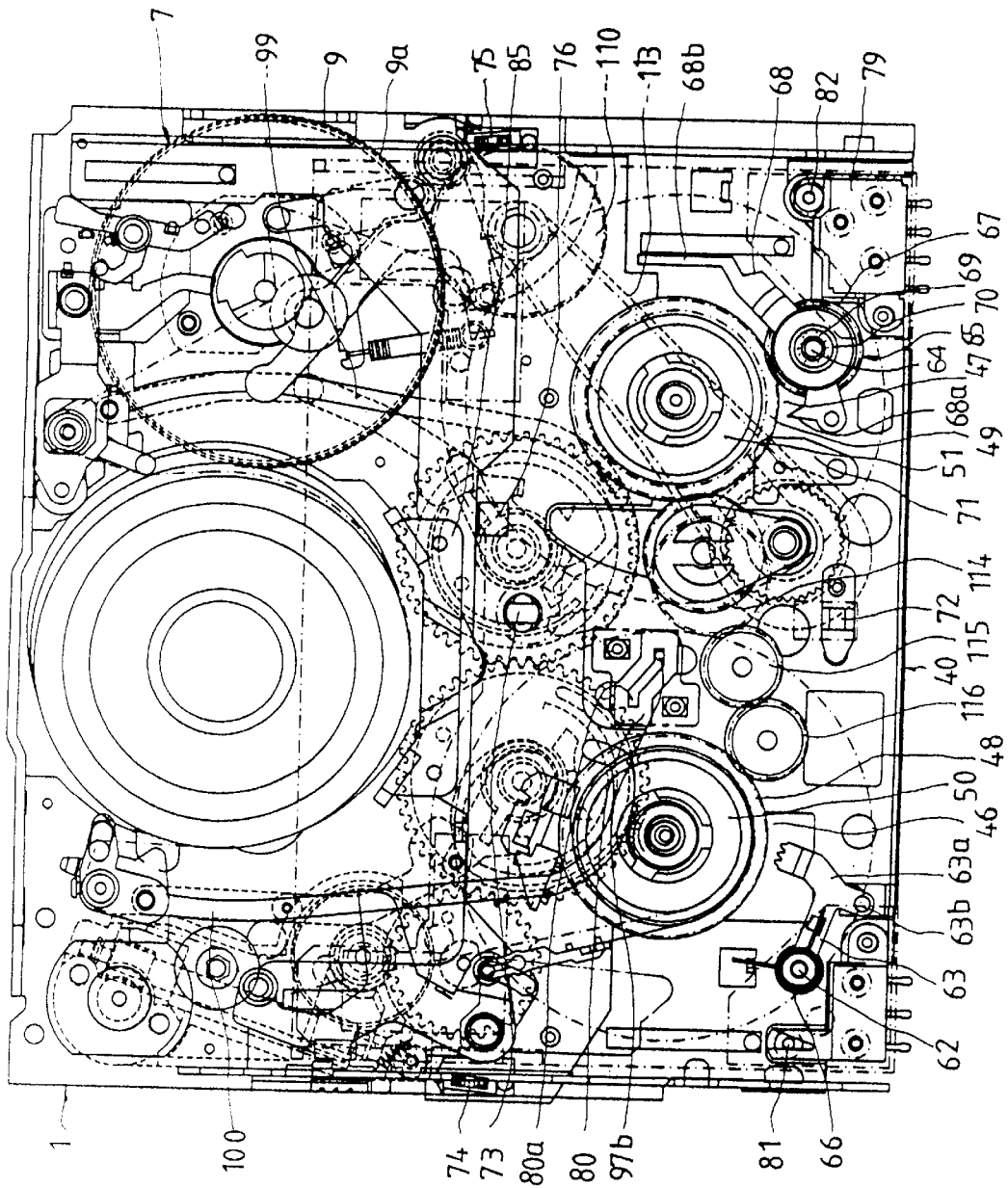
Figure 9:
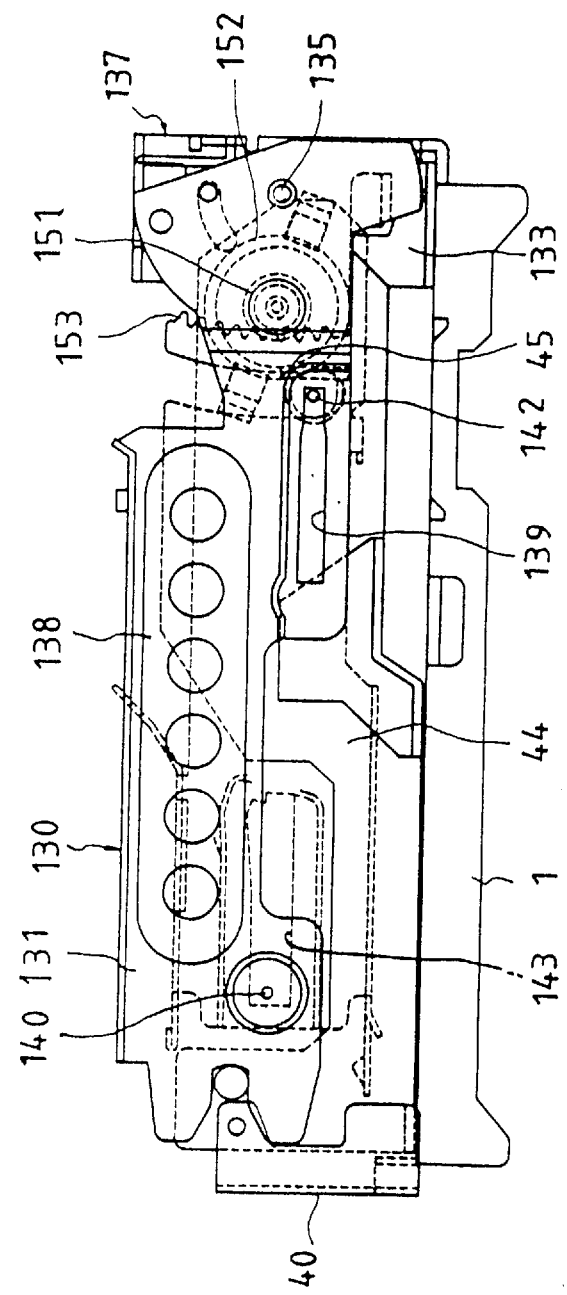

On the other hand, FIGS. 3 and 9 show a state that the tape loading operation is completed. At this time, the slide base 40 is positioned as having moved rearwardly by the length L. At this state, the front ends of fixed base plate 1 and slide base 40 are aligned with each other.

Figure 2A:
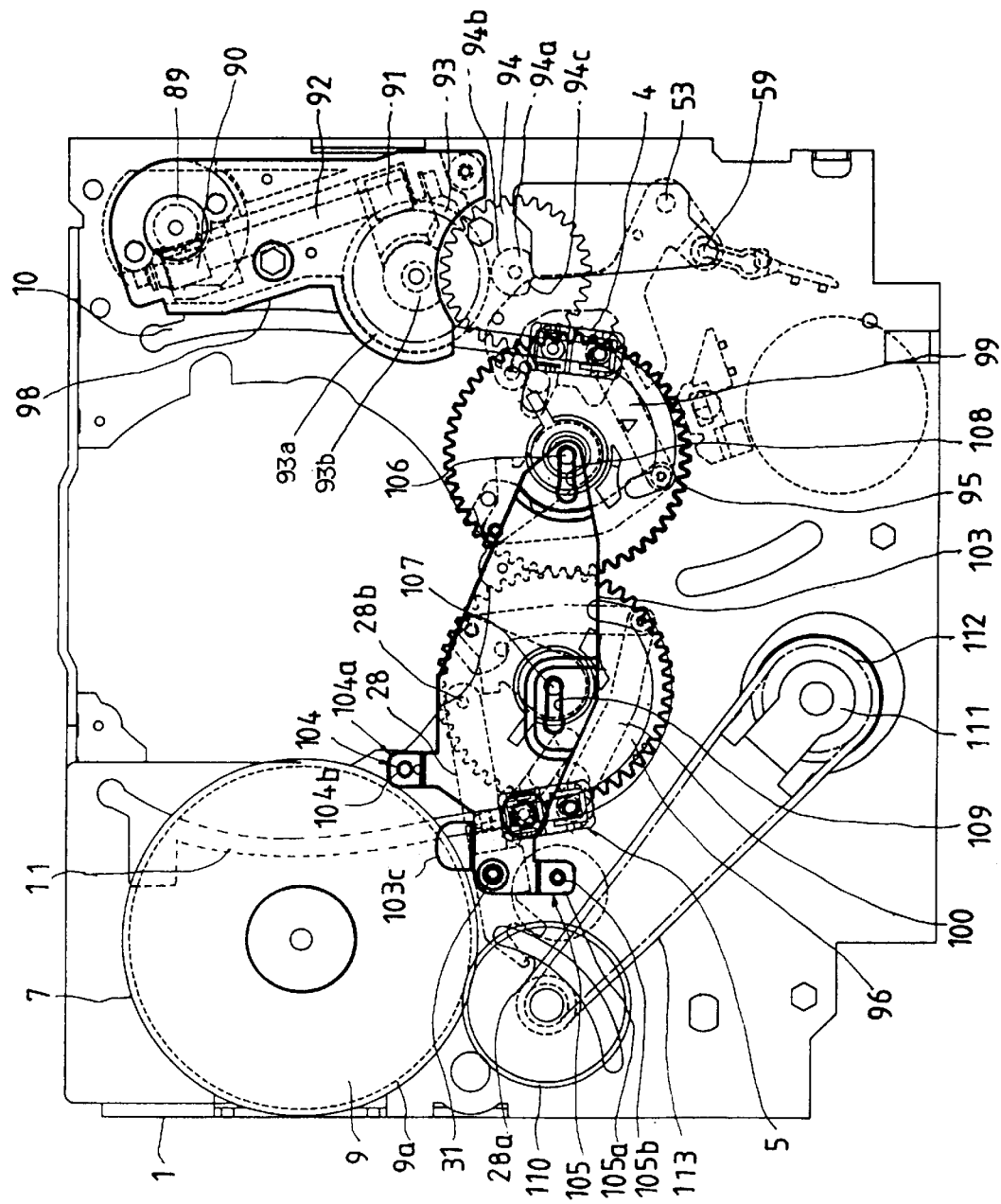
FIG. 2A is a bottom view showing the state before the tape loading operation under a condition that a slide base is removed.
Figure 16A:
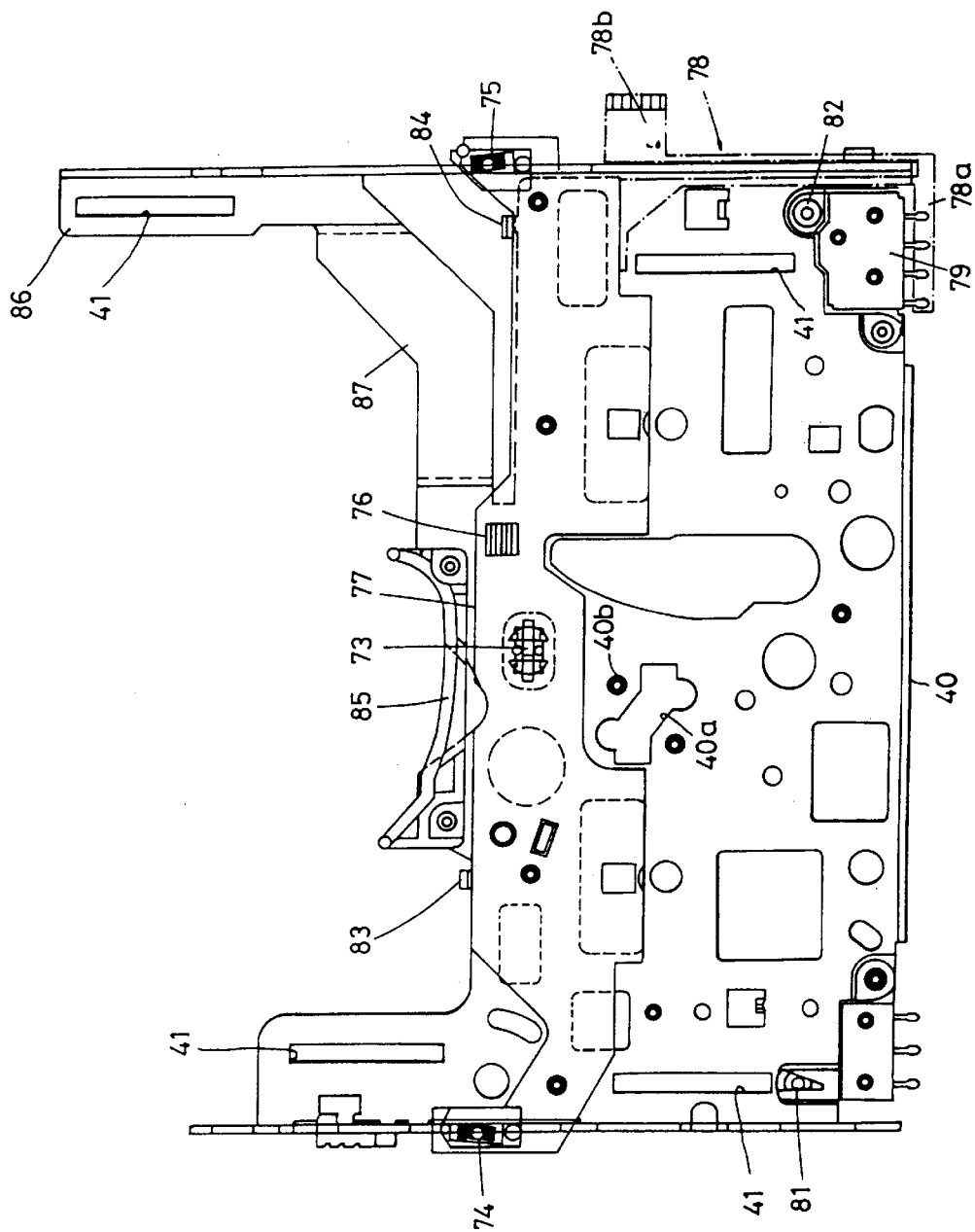
FIG. 16A is a plan view showing the slide base of the deck mechanism.
Figure 16B:
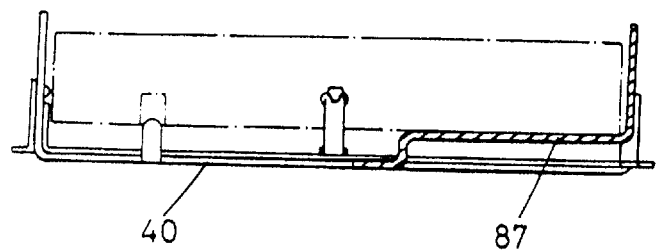
FIG. 16B is a partial sectional view showing the slide base of FIG. 16A.

FIGS. 2A and 16B show a state of the slide base 40 separated from the fixed base plate 1.

As shown in FIG. 1, the slide base 40 is provided at its opposite side portions with a plurality of longitudinally extending guide slots 41. From the upper surface of fixed base plate 1, a plurality of guide pins 42 are upwardly protruded, each of which is received in each corresponding guide slot 41, so as to guide the longitudinal movement of the slide base 40 on the fixed base plate 1. Since the slide base 40 is coupled to the fixed base plate 1 such that it is in contact with the fixed base plate 1, it is possible to avoid an increase in deck height.

The present invention is characterized in that the fixed base plate 1 and the slide base 40 are coupled to each other such that they are in contact with each other, that is, they define no space therebetween, and thus that various elements of the tape travelling system are distributed on the upper and lower surfaces of fixed base plate 1 and the upper surface of the slide base 40.

As shown in FIG. 1, mounted on the upper surface of the fixed base plate 1 are a rotation head drum 2, a loading motor 3, supply and take-up slant post assemblies 4 and 5, a stabilizer 6, pinch roller arm driving and pressing means, head cleaning means, a capstan motor 7 and a capstan shaft 8. Mounted on the lower surface of fixed base plate 1 are a power transmission system for the loading motor 3, a rotor magnet 9 of the capstan motor 7, an idler mechanism, and sensing means. On the other hand, mounted on the upper surface of slide base 40 are supply and take-up reel tables 46 and 47, tension adjusting means, and brake means.

Now, the construction according to an embodiment of the present invention will be described in detail.

Referring to FIG. 1 and 2, the fixed base plate 1 is shown as including the rotary head drum 2 which is slantly arranged in a proper direction and upwardly protruded from the fixed base plate 1. A pair of loading guide holes 10 and 11 are formed in opposite sides of the head drum 2. To the loading guide holes 10 and 11, supply and take-up slant post assemblies 4 and 5 are coupled so that they slide longitudinally along the loading guide holes 10 and 11, respectively.

The supply slant post assembly 4 comprises a slant post base 12 coupled to the loading guide hole 10, to slide longitudinally along the loading guide hole 10, a guide roller 14, and a slant post 16. Similarly, the take-up slant post assembly 5 comprises a slant post base 13 coupled to the loading guide hole 11, to slide longitudinally along the loading guide hole 11, a guide roller 15, and a slant post 17.

The loading motor 3 is fixedly mounted on one corner portion of the upper surface of the fixed base plate 1 (namely, the left rear corner portion when viewed in FIG. 1), to be upwardly protruded from the corner portion. In front of the loading motor 3, the stabilizer 6 is disposed, which is upwardly protruded and adapted to rotate about a shaft 18, for improving a tape travel stability.

A capstan housing 19 is fixedly mounted on the other side portion of the upper surface of fixed base plate 1 (namely, the right rear portion when viewed in FIG. 1) by means of a plurality of screws, to be upwardly protruded from the other side portion. From the capstan motor 7 which is fixedly mounted on the lower surface of fixed base plate 1, the capstan shaft 8 is upwardly protruded such that it is received in and supported by the capstan housing 19, for a rotation.

In front of the capstan housing 19, the pinch roller arm driving and pressing means is disposed, which is adapted to move a pinch roller 20 and a take-up post 21 in a loading direction and make the pinch roller 20 come into pressing contact with the capstan shaft 8 under a proper pressure. In the rear of the pinch roller arm driving and pressing means, the head cleaning means is disposed, which is operatively connected with the slide base 40, to automatically clean a video head of the head drum 2.

Figure 10:
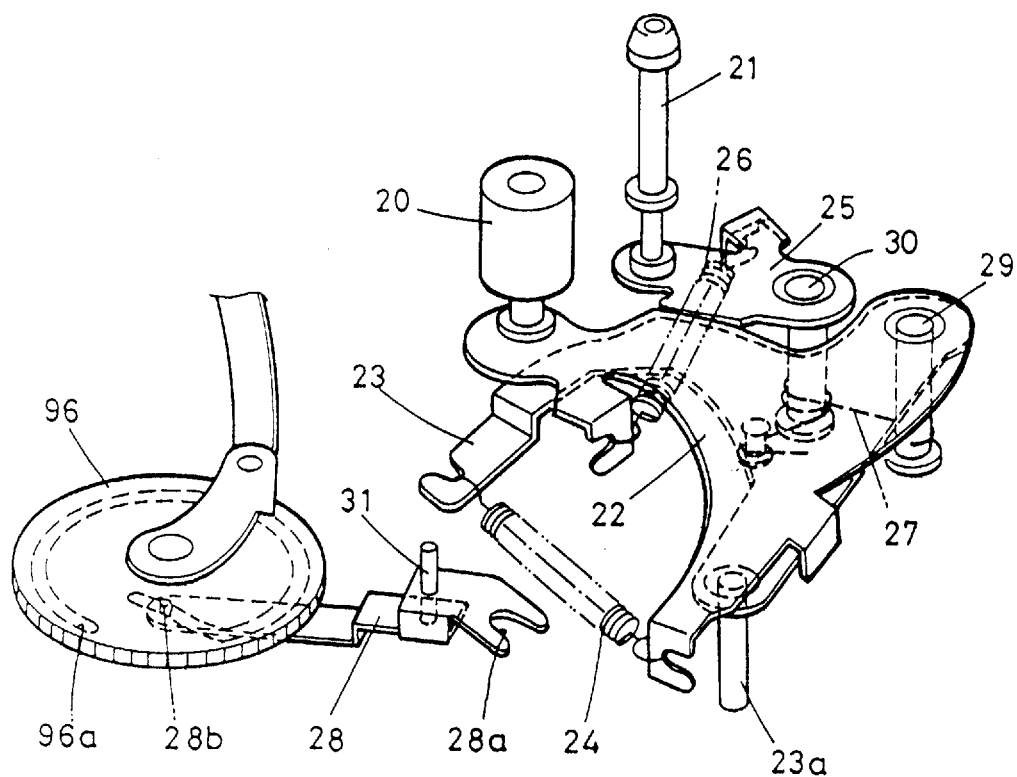

As shown in FIGS. 1 and 10, the pinch roller arm driving and compressing means comprises a pinch arm 22 to which the pinch roller 20 is rotatably coupled, an actuating arm 23 having an engaging pin 23a, a tension spring 24 for connecting the actuating arm 23 to the pinch arm 22, a take-up arm 25 to which the take-up post 21 for guiding the travelling of the tape is fixed, a tension spring 26 for connecting the take-up arm 25 to the pinch arm 22, a torsion spring 27 for always urging the take-up arm 25 in one direction (clockwise in FIG. 10), and a pinch roller-driving cam lever 28 provided at its one end with an engaging groove 28a engaging with the engaging pin 23a of actuating arm 23 and adapted to pivot the actuating arm 23 according to a rotation of a loading gear 96.

The pinch arm 22 and the actuating arm 23 are rotatably mounted at a proper portion of the upper surface of fixed base plate 1 by means of a common shaft 29. The take-up arm 25 is rotatably coupled to a shaft 30 fixed in the rear of the shaft 29.

The pinch roller-driving cam lever 28 is rotatably coupled to a shaft 31 fixed to the lower surface of fixed base plate 1. The cam lever 28 is also provided at the other end thereof with a cam pin 28b which is engaged in a cam groove 96a formed at the lower surface of loading gear 96. The loading gear 96 is rotatably mounted at the lower surface of fixed base plate 1.

Referring to FIGS. 1, 2A, 3, 4, and 10, a pair of loading gears 95 and 96 are shown as being engaged with each other. To the loading gears 95 and 96, loading arms 99 and 100 are connected, respectively, each of which is constituted by three levers each having opposite ends pivotally connected with ends of the others by means of pins, to form a link mechanism. As shown in FIGS. 1, 2A and 3, the loading arms 99 and 100 are connected at one ends thereof to the upper surfaces of loading gears 95 and 96, by means of springs and conventional connection constructions, respectively, so that they are disposed at the lower surface of fixed base plate 1. To the other ends of loading arms 99 and 100, the bases 12 and 13 of slant post assemblies 4 and 5 are pivotally connected by means of pins, respectively.

As shown in FIGS. 1 and 2A, the slant post assemblies 4 and 5 are disposed to be upwardly protruded from the fixed base plate 1. On the other hand, the loading arms 99 and 100 and the loading gears 95 and 96 are disposed at the lower surface of fixed base plate 1, to be downwardly protruded.

Figure 12A:
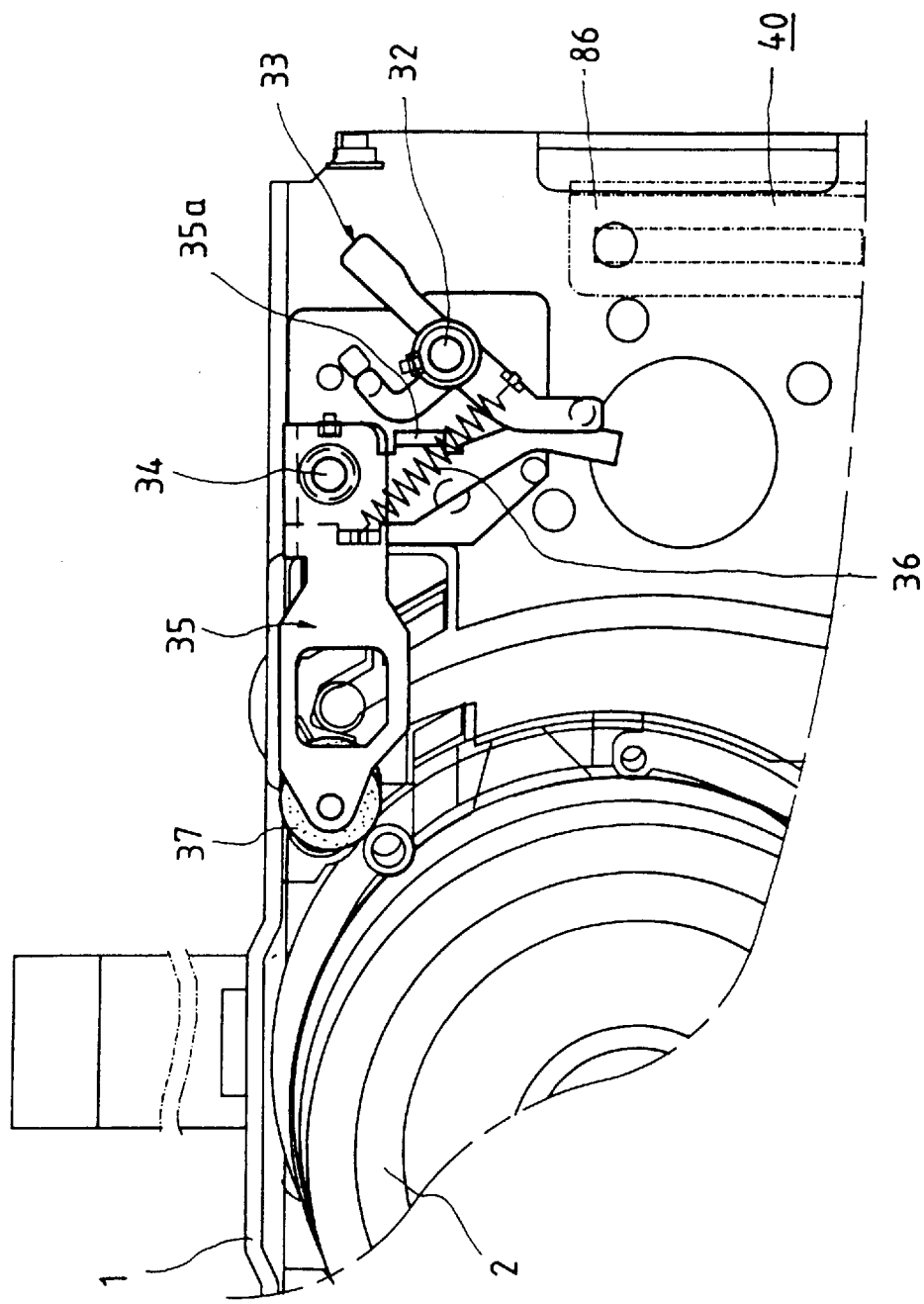
FIGS. 12A to 12C are enlarged plan views of head cleaning means of the deck mechanism.
Figure 12B:
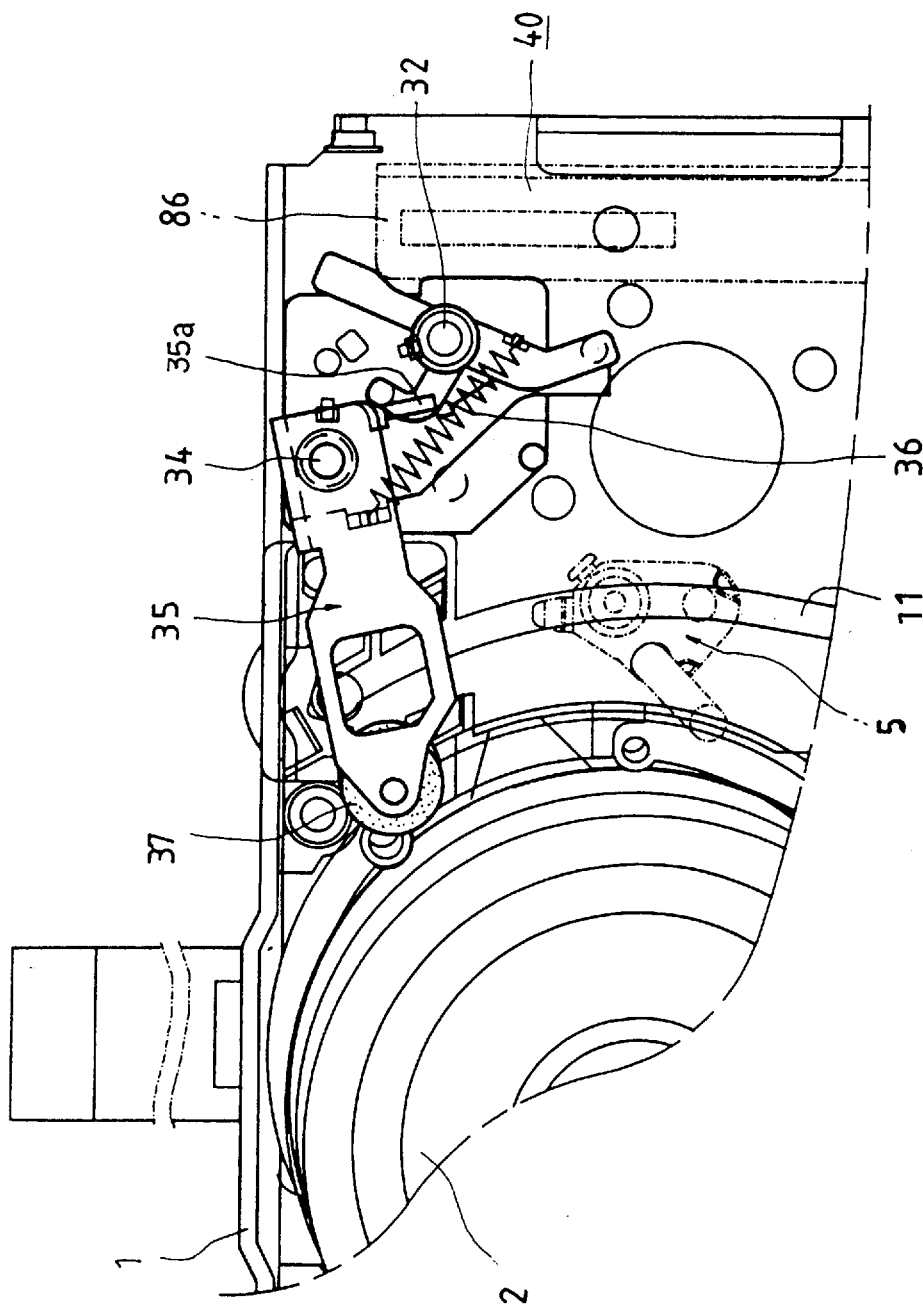
Figure 12C:
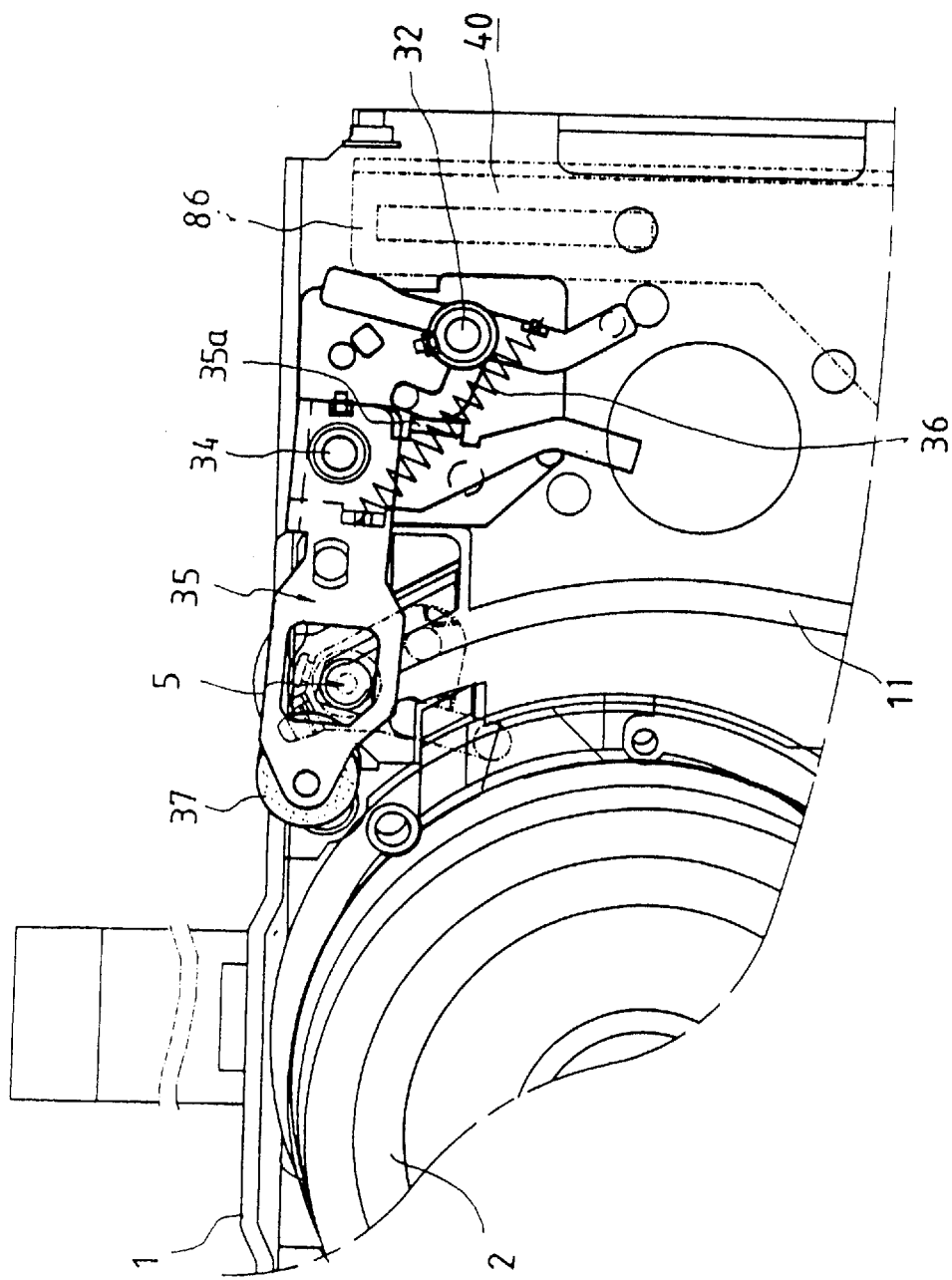

As shown in FIGS. 1 and 12, the head cleaning means comprises an actuating arm 33 rotatably mounted to a pin 32 fixed at one rear corner portion of the upper surface of fixed base plate 1 and actuated by a slide movement of the slide base 40, a cleaning lever 35 pivotally mounted to a pin 34 fixed at one side of the actuating arm 33 and operatively connected to the actuating arm 33, a tension spring 36 for connecting the cleaning lever 35 to the actuating arm 33, and a cleaning roller 37 pivotally connected to one end of the cleaning lever 35 and adapted to clean the head drum 2. With this construction, the head cleaning means performs a head cleaning operation during the sliding operation of slide base 40.

Figure 6:
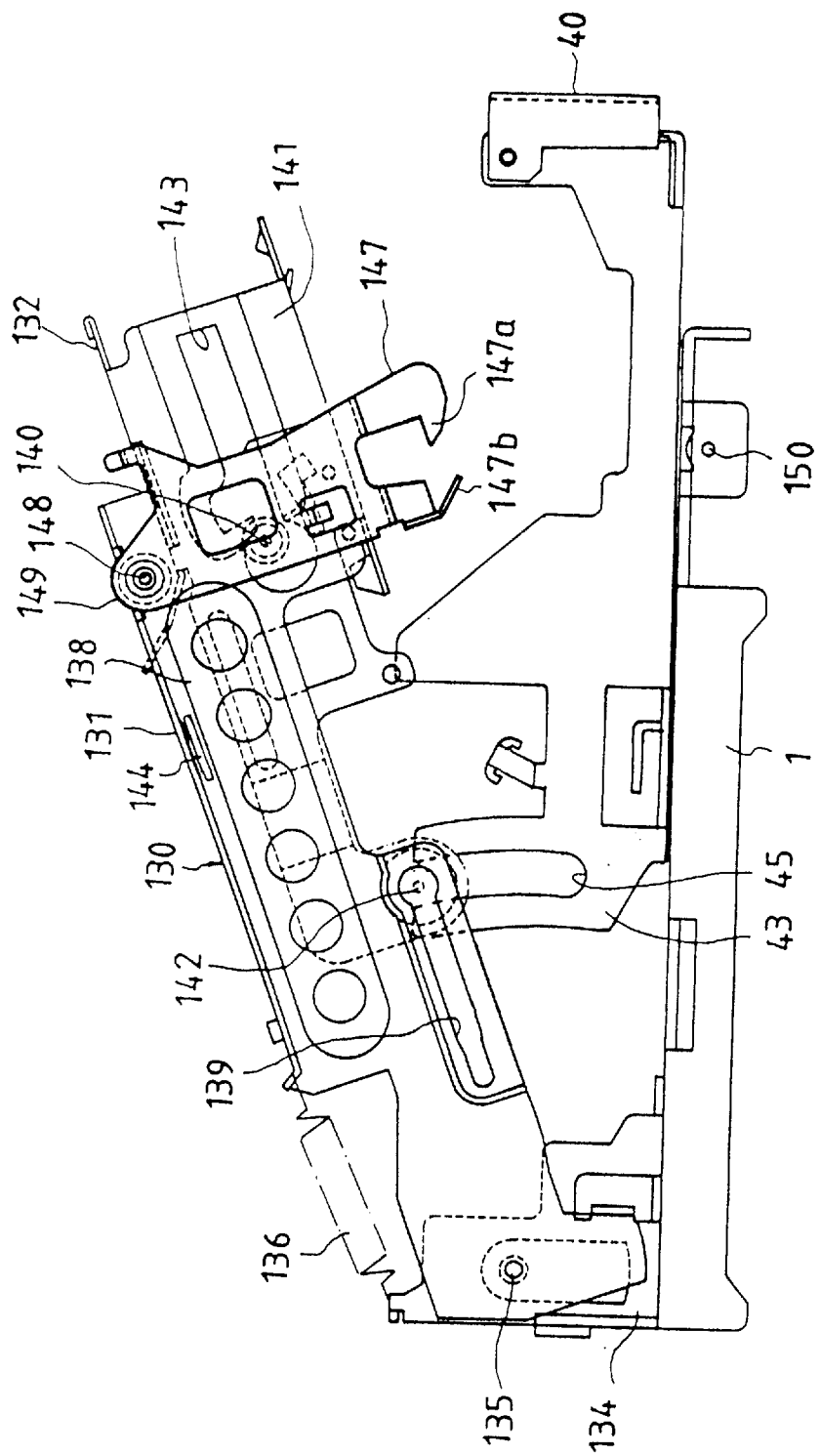

At the rear portion of fixed base plate 1, the cassette housing 130 is pivotally coupled, at left ends (FIG. 6) of opposite side walls thereof, to rear ends (left ends in FIG. 6) of opposite side walls of the fixed base plate 1, by means of pins 135, as shown in FIGS. 5 and 6.

The cassette housing 130 includes a cassette holder 132 which slides for a predetermined distance, together with the slide base 40.

As shown in FIGS. 1 and 2A, the supply and take-up reel tables 46 and 47 are disposed at opposite side portions of the upper surface of slide base 40, respectively. Rotation operations of the supply and take-up reel tables 46 and 47 are controlled by the brake means. The rotation of supply reel table 46 is controlled by the tension adjusting means.

The supply reel table 46 comprises a lower reel gear 48 and an upper reel body 50. Similarly, the take-up reel table 47 comprises a lower reel gear 49 and an upper reel body 51. Between each reel gear and each corresponding reel body, a conventional frictional clutch construction is provided for adjusting a rotational torque. By the frictional clutch constructions, frictional forces are applied to the supply and take-up reel tables 46 and 47.

Figure 13A:
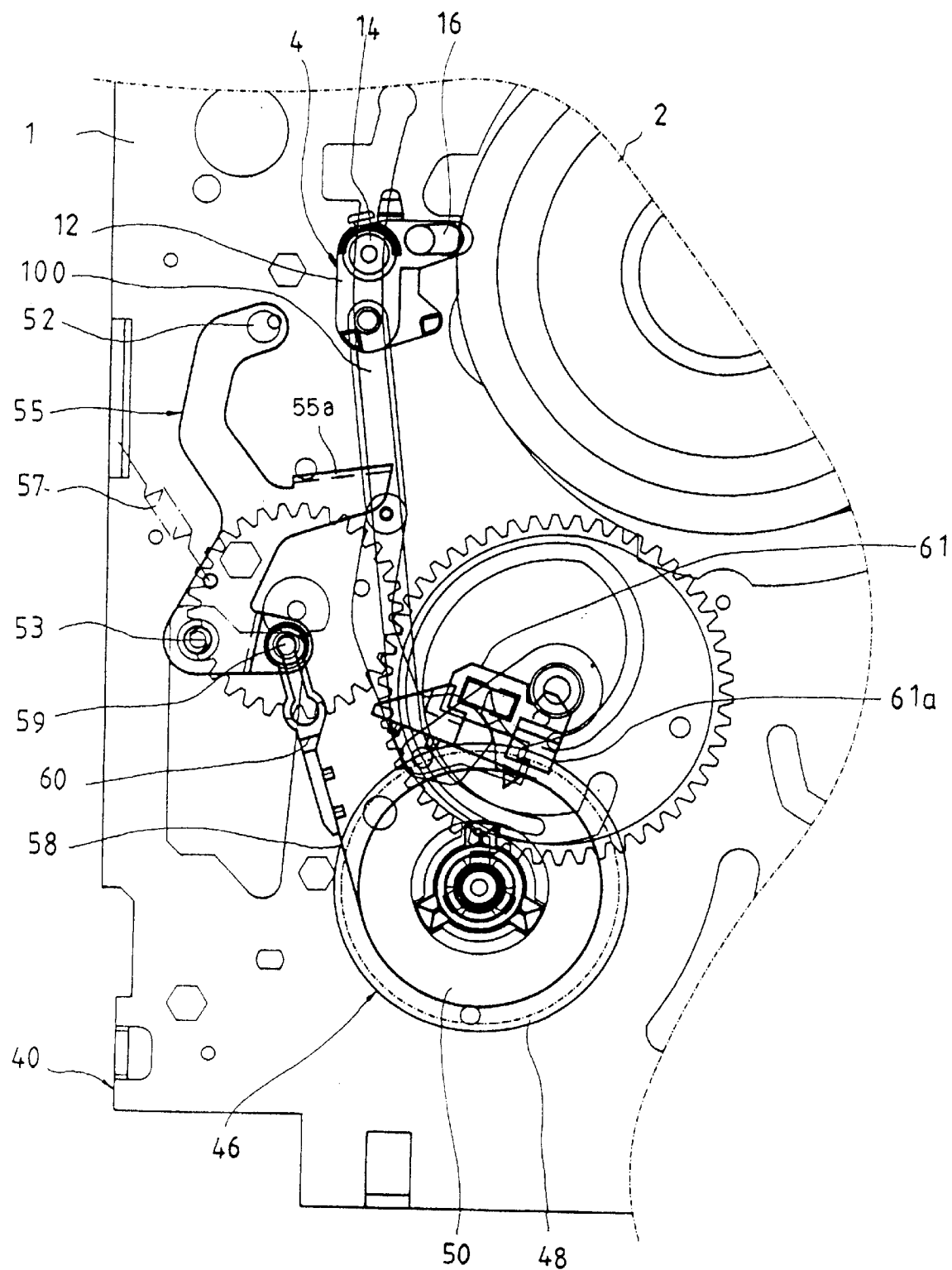
FIGS. 13A and 13B are partial enlarged views of tape tension adjusting means of the deck mechanism.
Figure 13B:
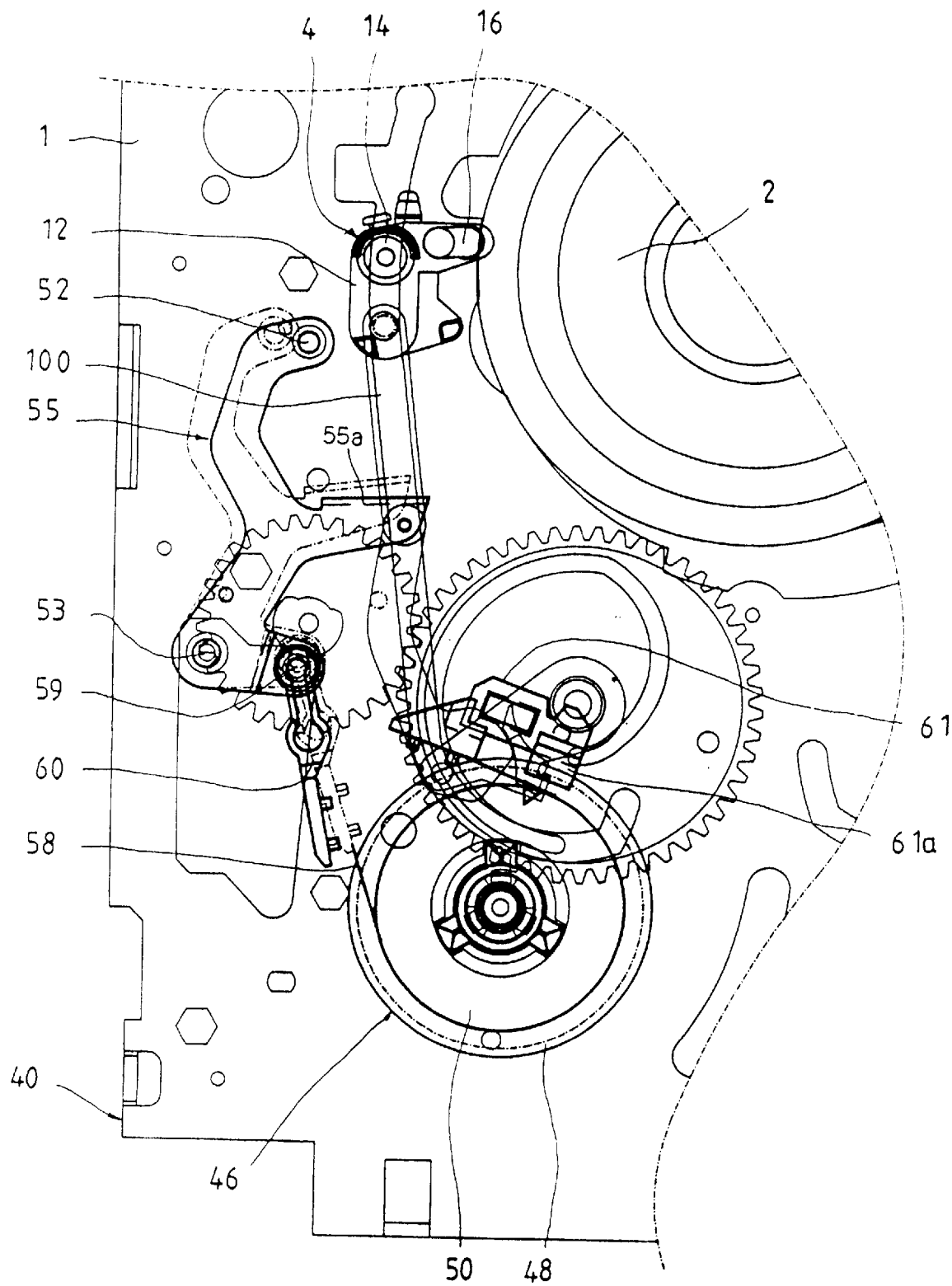

As shown in FIGS. 13A and 13B, the tension adjusting means comprises a tension arm 55 provided at its rear end with a tension post 52 and pivotally coupled to one side portion of the upper surface of slide base 40 by means of a pin 53. The tension arm 55 also has a contact protrusion 55a at its middle portion. A tension spring 57 is connected at one end thereof to one side portion of the tension arm 55 and at the other end thereof to the slide base 40. The tension spring 57 serves to always urge the tension arm 55 to pivot in counter-clockwise. The tension arm 55 is also provided at its front end with an actuating pin 59 extending from the tension arm 55 upwardly and downwardly. To the actuating pin 59, a connecting member 60 is pivotally coupled. The tension adjusting means also comprises a tension band 58 wound around the reel body 50 of supply reel table 46 and connected at one end thereof to the connecting member 60 and at the other end thereof to the slide base 40. A variable connecting member 61 is also provided, to which the other end of tension band 58 is fixedly connected. The variable connecting member 61 is fixedly mounted at a proper portion of the slide base 40 and provided with an engaging jaw 61a for preventing a separation of the reel gear 48 of supply reel table 46. With these constructions, the tension adjusting means serves to apply a proper tension to the tape, for achieving a more stable travelling of the tape.

Figure 15:
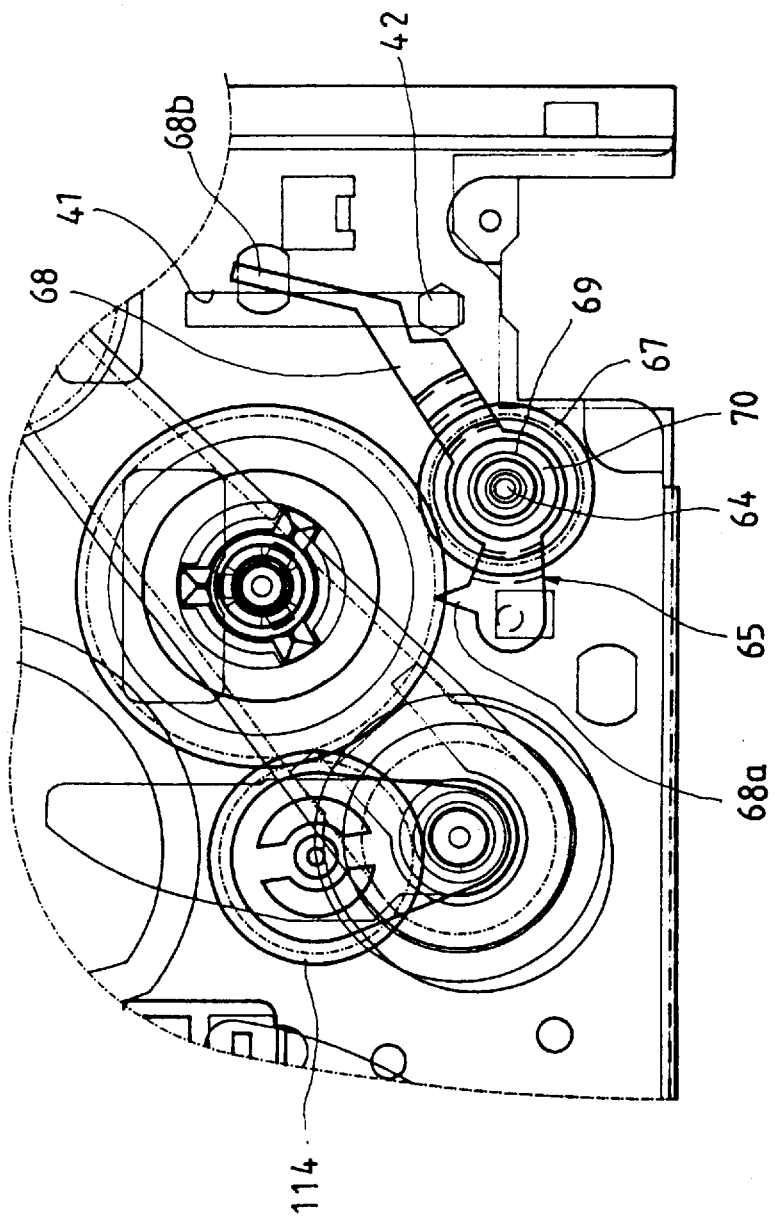

The brake means comprises a supply brake 63 pivotally mounted to a pin 62 fixed to one side portion of the slide base 40 and adapted to control the rotation operation of the supply reel table 46, as shown in FIG. 14. The brake means also comprises a take-up brake 65 pivotally mounted to a pin 64 fixed to the other side portion of the slide base 40 and adapted to control of the rotation operation of take-up reel table 47, as shown in FIG. 15. Accordingly the brake means performs control operations for supply and take-up reel tables 46 and 47 in various modes.

The supply brake 63 has at one end thereof a gear portion 63a engaged with the reel gear 48 of supply reel table 46. From one side portion of the lower surface of supply brake 63, an actuating pin 63b is downwardly protruded, which extends through a hole formed the fixed base plate 1. Around the pin 62, a torsion spring 66 is coaxially mounted which is adapted to always urge the supply brake 63 to pivot counter-clockwise.

As shown in FIGS. 3 and 15, the take-up reel brake 65 includes a cap 70 rotatably mounted to the upper end of pin 64, a brake gear 67 fixedly mounted to the lower portion of cap 70 and always engaged with the reel gear 49 of take-up reel table 47, a brake lever 68 pivotally coupled to the cap 70 and provided at one end thereof with engaging teeth 68a engaged with the reel gear 49 and at the other end thereof with a straight extension 68b, and a compression spring 69 connected between the cap 70 and the brake lever 68 and adapted to urge the brake lever 68 downwardly.

To one side portion of the take-up brake 55, a support member 71 is fixedly mounted, as shown in FIG. 1. The support member 71 serves to hold the reel gear 49 of take-up reel table 47, so as to prevent the reel gear 49 from being accidently separated.

A reel brake release member 72 for releasing a reel brake force is fixedly mounted at the middle part of the front portion of slide base 40, as shown in FIG. 1.

Figure 11:
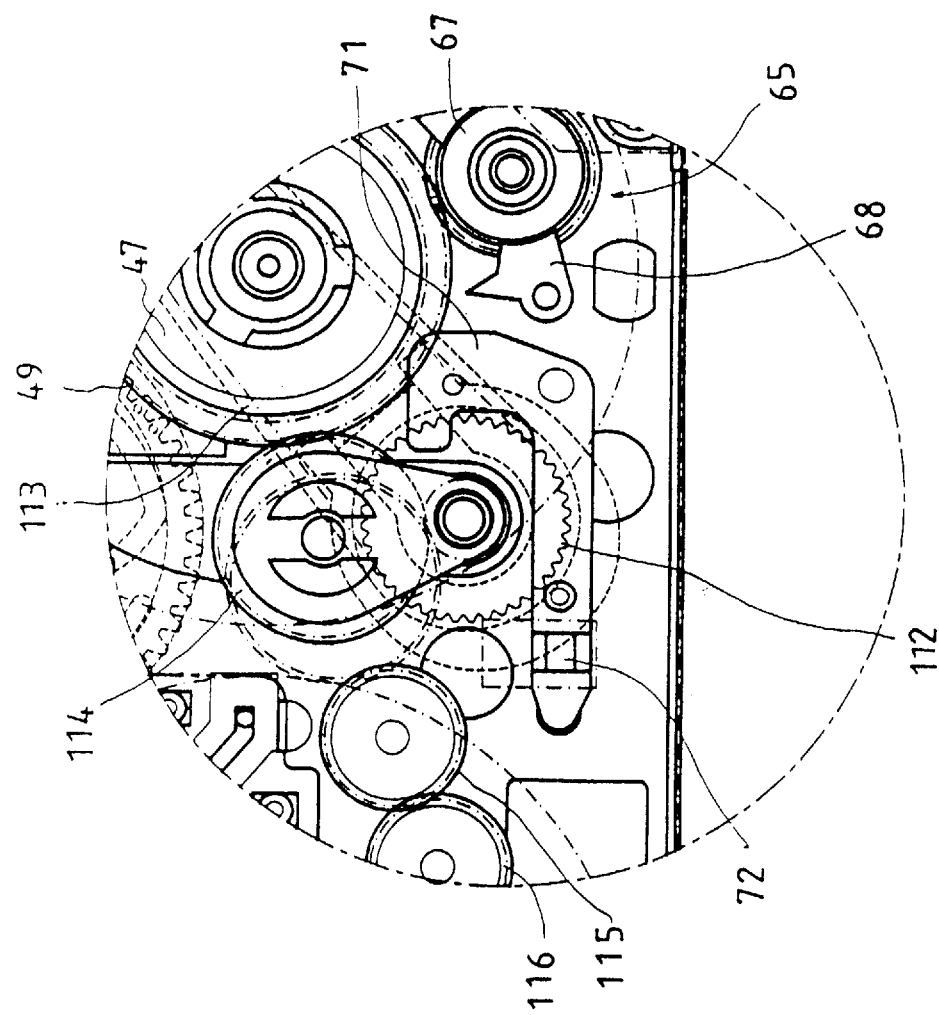

For improving a workability in assembling, the reel brake release member 72 is integrally formed with the support member 71 for supporting the reel gear 49 of take-up reel gear 49, as shown in FIG. 11.

On the slide base 40, various sensors for sensing conditions of various elements of the deck mechanism are disposed. As shown in FIGS. 16A and 16B, the sensors include a light emitting sensor 73 and a pair of light receiving sensors 74 and 75 for sensing the ends of the tape wound around the supply reel table 46 and the take-up reel 47, a pair of reel sensors for sensing rotations of the supply and take-up reel tables 46 and 47, and a dew sensor 76 for sensing the degree of dewing in the interior of the deck. Also, attached to the slide base 40 is a printed circuit board 77, to which a flexible printed circuit board 78 is connected. The flexible printed circuit board 78 has an extension 78a fixedly mounted on one corner portion of the slide base 40. To the extension 78a, a switch 79 for defining the form of cassette is attached, so as to be electrically connected to the printed circuit board 78.

The flexible printed circuit board 78 also has a connector 78b, through which a transmission of electrical signal is achieved.

On the middle portion of slide base 40, a slide cam 80 with a cam hole 80a is threadedly mounted, to move longitudinally, as shown in FIG. 1. The slide cam 80 serves to adjust the slide stroke of the slide base 40.

For the association with the slide cam 80, the slide base 40 has a hole 40a and a pair of threaded holes 40b arranged in opposite sides of the hole 40a, as shown in FIG. 16B. The slide cam 80 has a pair of screw receiving holes 80b arranged in opposite sides of the cam hole 80a. As an adjusting screw 155 is threadedly inserted into the hole 80b and threaded hole 40b aligned with each other, the slide cam 80 can be mounted to the slide base 40 under a condition that its position can be adjusted.

The adjustment for the slide stroke of slide base 40 by the position of slide cam 80 adjusted with respect to the slide base 40 will be described hereinafter.

A pair of support pins 81 and 82 for supporting the tape cassette are provided at opposite parts of the front upper surface portion of slide base 40, respectively. At opposite parts of the rear upper surface portion of slide base 40, a pair of bent support portions 83 and 84 are formed, using a bending work.

Figure 17:
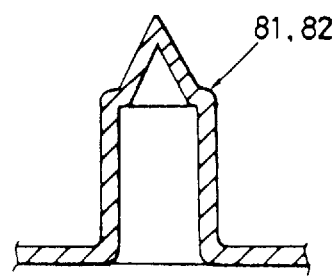

The support pins 81 and 82 can be integral with the slide base 40, by bending opposite edges of the front portion of slide base 40, as shown in FIG. 17. In this case, it is possible to improve a productivity and a workability in assembling.

Figure 16C:
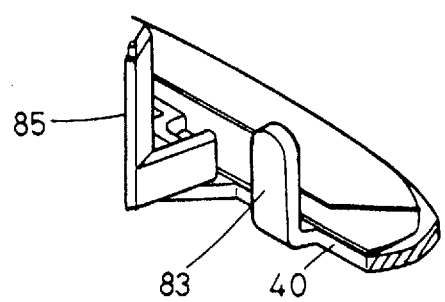
FIG. 16C is a partial perspective view showing support members for a tape cassette and a protect member for a head.

To the middle part of the front portion of slide base 40, a protect member 85 is fixedly mounted, which serves to support an opened lid (not shown) of the tape cassette and prevent an erroneous insertion of the tape cassette and a penetration of foreign matters into the interior of the tape cassette. As shown in FIG. 16C, the protect member 85 has a proper height.

As shown in FIGS. 1 and 12, and particularly in FIG. 16A, an elongated extension 86 extends rearwardly from one side portion (left portion) of the rear end of slide base 40. The extension 86 is operatively connected with the actuating arm 33 of the head cleaning means. As shown in FIG. 16B, the extension 86 is attached with a reinforcing member 87 which has a step with a certain height and reinforces the extension 86.

The reinforcing member 87 is adapted to reinforce the strength of extension 86, since the extension 86 has a large length that causes a degradation in strength.

Also, the reinforcing member 87 is of a bent construction having the step with a certain height. With this construction, the reinforcing member 87 does not interfere with elements constituting the pinch roller arm driving and pressing means, when the slide base 40 moves rearwardly from its position of FIG. 1 to its position of FIG. 3 with respect to the fixed base plate 1.

Referring to FIGS. 1, 2A, and 18 to 21, there is illustrated a construction of the power transmission means. The power transmission means comprises a drive worm gear 89 coupled to a rotation shaft 88 of the loading motor 3, a gear shaft 92 provided at one end thereof with a worm 90 engaged with the drive worm gear 89 of loading motor 3 and at the other end thereof with a worm 91, and a double gear 93 having a large diameter gear portion 93a and a small diameter gear portion 93b. The large diameter gear portion 93a of double gear 93 is engaged with the worm 91 of gear shaft 92. An intermediate gear 94 is also provided, which has at its upper surface an actuating cam 94a engaged with the small diameter gear portion 93b of double gear 93. With the intermediate gear 94, cam grooves 95a and 96a of the loading gears 95 and 96 are engaged. The power transmission means also comprises a cam lever 97 adapted to pivot by the rotation of loading gear 95, for moving the slide base 40. With these constructions, the power transmission means serves to transmit the drive power from the loading motor 3 to the supply and take-up slant post assemblies 4 and 5 via the loading gears 95 and 96 and to the slide base 40.

Figure 18A:
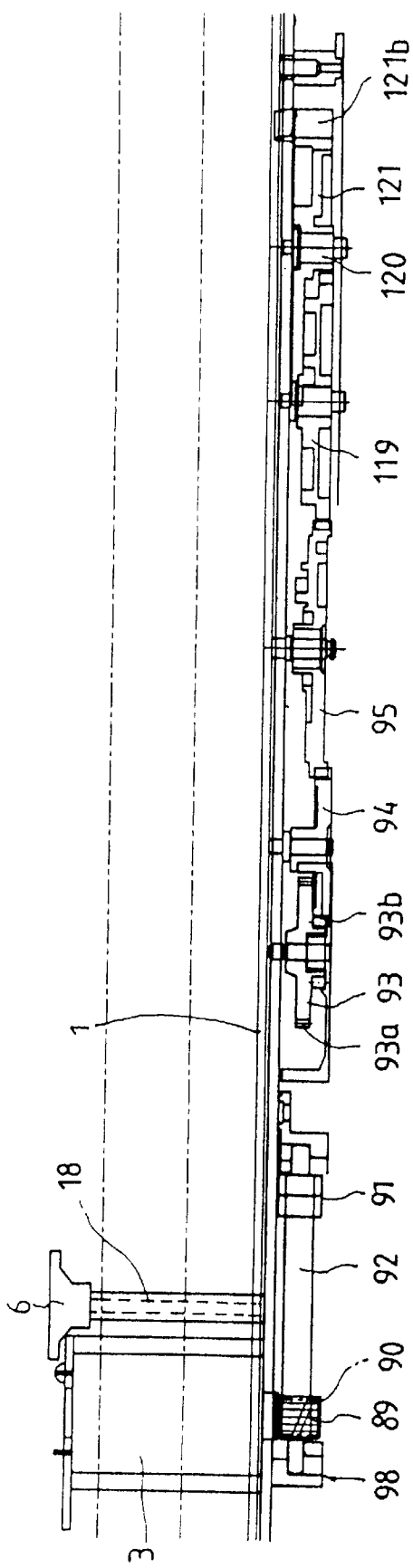
FIG. 18A is a sectional view showing a power transmission system of the deck mechanism.
Figure 18B:
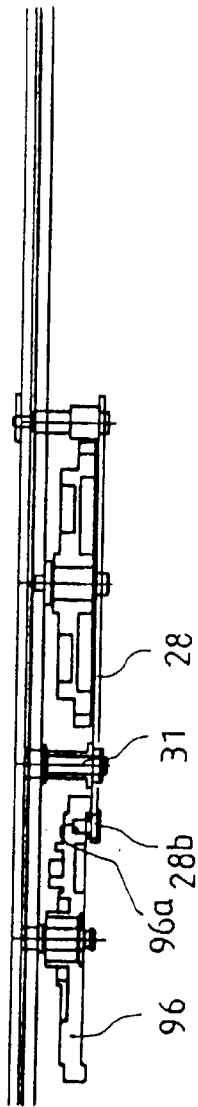
FIG. 18B is a sectional view showing loading gears and a cam lever of the deck mechanism.

Referring to FIG. 18A, it can be found that the loading motor 3 is installed to be protruded from the upper surface of fixed base plate 1, whereas the gear trains are mounted on the lower surface of fixed base plate 1.

Figure 19:
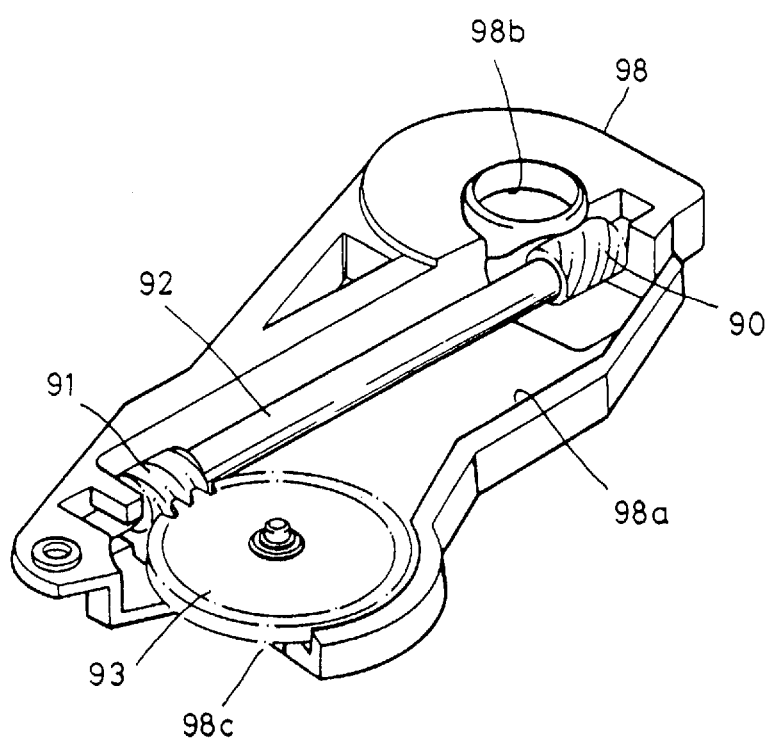

The gear shaft 92 and the double gear 93 are supported by a gear housing 98 fixed to the lower surface of fixed base plate 1, as shown in FIG. 19.

The gear housing 98 has a recess 98a for receiving the gear shaft 92 and the double gear 93 therein, as shown in FIG. 19. The gear housing 98 also has at one side portion thereof a hole 98b for receiving the drive worm gear 89 of loading motor 3 and at the other side portion thereof an opening 98c, through which the double gear 93 and the intermediate gear 94 are engaged with each other.

Figure 21:
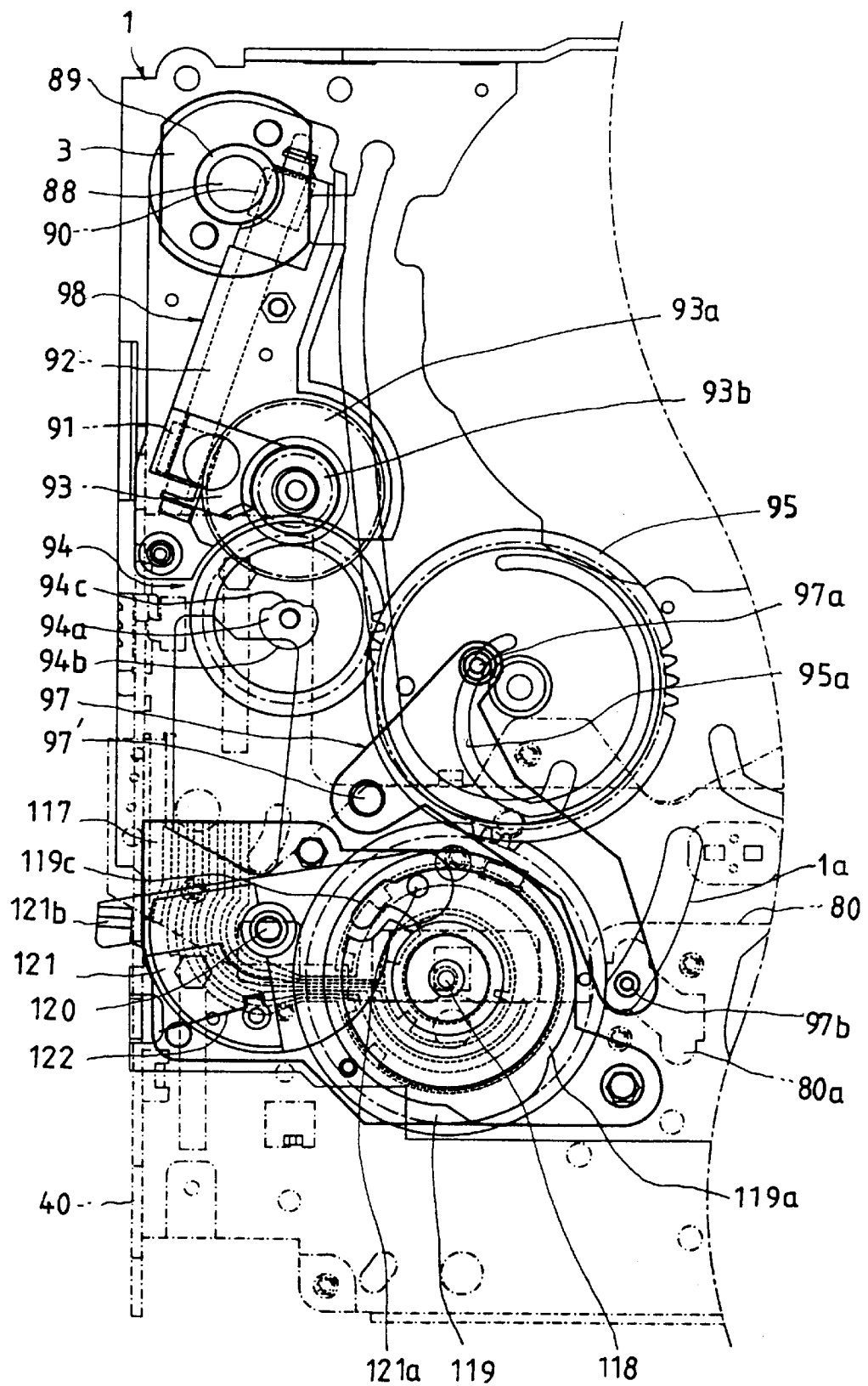

As shown in FIG. 21, the intermediate gear 94 has an actuating cam 94a with a large diameter portion 94b and a small diameter portion 94c.

The cam lever 97 has at one end thereof a cam pin 97a engaged in the cam groove 95a of loading gear 95 and at the other end thereof an engaging pin 97b engaged in the cam hole 80a of the slide cam 80 of slide base 40 through an arc guide hole 1a of the fixed base plate 1, as shown in FIG. 21. The cam lever 97 pivots about a pin 97' fixedly mounted on one side portion of the lower surface of fixed base plate 1.

The pivotal movement of the cam lever 97 is carried out, when the loading gear 95 rotates by the driving force of loading motor 3. By the pivotal movement of cam lever 97, the engaging pin 97b of cam lever 97 pushes the slide cam 80, thereby causing the slide base 40 to move.

Since the slide base 40 is of the construction capable of moving upon the movement of slide cam 80, its slide stroke can be adjusted by adjusting the position of slide cam 80.

At the middle portion of the lower surface of fixed base plate 1, the pinch roller-driving cam lever 28 is supported by the shaft 31, as shown in FIGS. 2A and 2B. A cam cover plate 103 is also fixedly mounted on the middle portion of the lower surface of fixed base plate 1. The cam cover plate 103 serves to support the loading gears 95 and 96 and the rotor magnet 9 of capstan motor 7.

As shown in FIGS. 2A and 2B, the cam cover plate 103 has a planar body 103a such as a stainless plate and a pair of engaging holes 108 and 109 for supporting respective central shafts 107 and 106 of the loading gears 95 and 96. The engaging hole 108 has a large diameter receiving portion 108a and a small diameter engaging portion 108b. In similar, the engaging hole 109 has a large diameter receiving portion 109a and a small diameter engaging portion 109b. As the cam cover plate 103 slides, small diameter engaging portions 107a and 106a of the central shaft. 107 and 106 are engaged in the engaging portions 108b and 109b of engaging holes 108 and 109, respectively.

A support member 103c with a horizontal support portion 103d is provided at one edge portion of the planar body 103a. The support member 103c is of a bent construction having a step with a certain height and serves to prevent a separation of the rotor magnet 9 of capstan motor 7.

At opposite side portions of the planar body 103a, a pair of support angle members 104 and 105 are provided, respectively, each of which is of a bent construction having a step with a certain height. The support angle members 104 and 105 have horizontal support portions 104a and 105a provided with screw holes 104b and 105b for receiving screws 154, respectively.

The support angle members 104 and 105 are arranged in opposite sides of the loading guide hole 10, to be spaced a certain distance apart from each other so that they reinforce a degradation in strength of the fixed base plate 1 caused by the formation of loading guide hole 10.

The planar body 103a also has an axial hole 103b adapted to support the shaft 31 supporting the pinch roller-driving cam lever 28 and thus prevent a separation of the cam lever 28.

The mounting of the cam cover plate 103 to the fixed base plate 1 is achieved by inserting the central shafts 107 and 106 of loading gear 95 and 96 into the large diameter receiving portions 108a and 109a formed at the engaging holes 108 and 109 of cam cover plate 103 and then moving the cam cover plate 103, respectively, in a direction indicated by an arrow A in FIG. 2B. By the movement of the cam cover plate 103, the engaging portions 107a and 106a of central shafts 107 and 106 are engaged in the small diameter engaging portions 108b and 109b formed at the engaging holes 108 and 109 of cam cover plate 103, respectively, so that the loading gears 95 and 96 are prevented from being separated, Thereafter, the cam cover plate 103 is fitted around the shaft 31 of fixed base plate 1 such that the shaft 31 is received in the axial hole 103b formed at the other side portion of cam cover plate 103. Also, the screw holes 104b and 105b formed at the horizontal support portion 104a and 105a of support angle members 104 and 105 are aligned with the screw holes of fixed base plate 1, respectively. Then, the screws 154 are threadedly inserted into the screw holes 104b and 105b, so that the cam cover plate 103 is fastened to the fixed base plate 1.

Under the condition that the cam cover plate 103 is fastened to the lower surface of fixed base plate 1, it is possible to prevent a separation of the rotor magnet 9 of capstan motor 7. It is also possible to reinforce the fixed base plate 1 which is degraded in strength, due to the formation of the loading guide hole 10, in that the fixed base plate 1 is provided with the support angle member 104 and 105 arranged in opposite sides of the loading guide hole 10.

Figure 4:
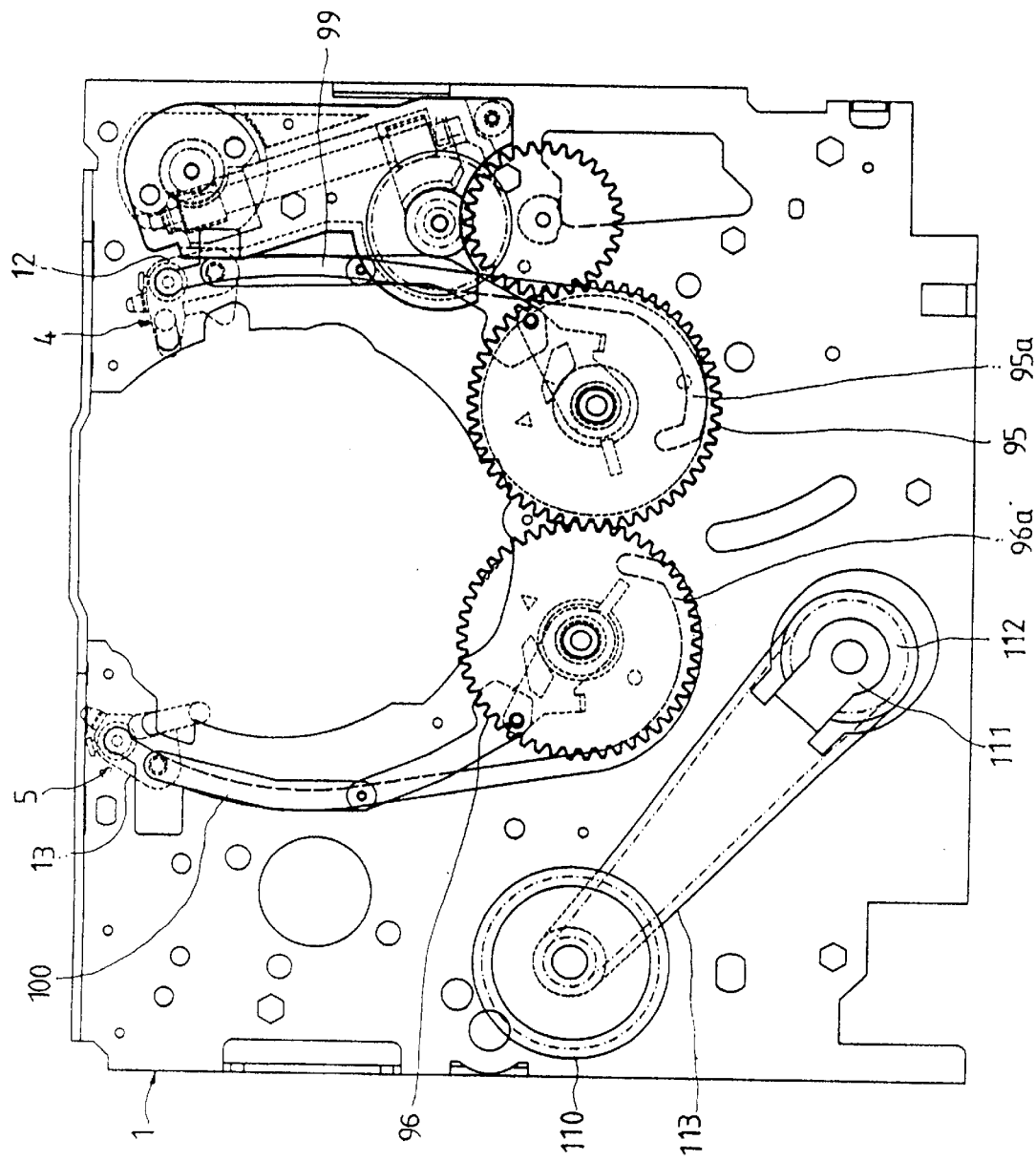
Figure 20:
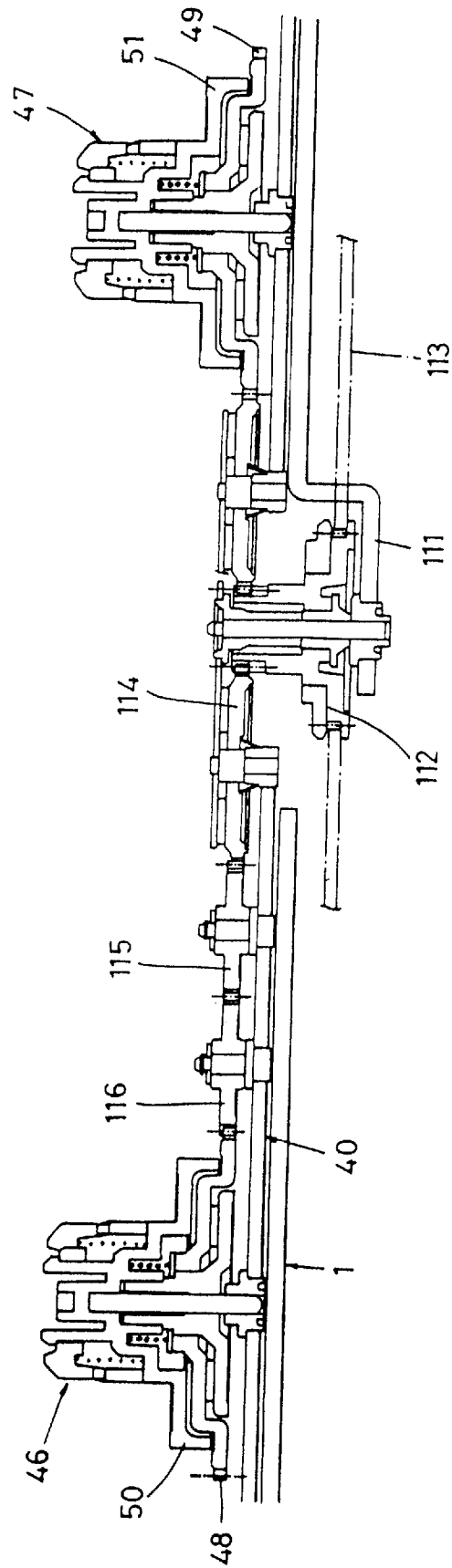

As shown in FIGS. 3, 4 and 20, the idler mechanism comprises a drive gear 110 engaged with a gear portion 9a formed at the rotor magnet 9 of capstan motor 7, a central gear 112 rotatably mounted to a fixing portion 111 of the fixed base plate 1, a timing belt 113 for connecting the central gear 112 with the drive gear 110, an idler gear 114 always engaged with the central gear 112, to rotate in clockwise and anticlockwise according to the rotation directions of central gear 112, and a pair of connecting gears 115 and 116 adapted to transmit the rotation force from the idler gear 114 to the supply reel table 46. With these construction, the idler mechanism serves to receive the drive force from the capstan motor 7 and thus drive the supply and take-up reel tables 46 and 47 selectively.

The formation of the fixing portion 111 of fixed base plate 1 is achieved by cutting and bending a part of the lower surface of fixed base plate I by a pressing work.

As shown in FIG. 21, the sensing means for sensing insertion and ejection of the tape cassette comprises a printed circuit board 117 mounted on one side portion of the lower surface of fixed base plate 1, a switch gear 119 rotatably mounted to a shaft 118 fixed to one side portion of the printed circuit board 117, a switch lever 121 rotatably mounted to a shaft 120 fixed to the other side portion of the printed circuit board 117 and operatively connected to the switch gear 119, and a torsion spring 122 coupled to the switch lever 121 and adapted to resiliently support the switch lever 121. With these constructions, the sensing means serves to insertion and ejection of the tape cassette and each operation mode.

The switch gear 119 has a cylindrical body 119a and a cam protrusion 119b provided at the outer circumferential surface of the cylindrical body 119a and adapted to come into contact with the actuating pin 63b of supply brake 63, as shown in FIGS. 1 and 21. At the inner circumferential surface of the cylindrical body 119a, a guide portion 119c is provided for guiding the pivoting of the switch lever 121.

The switch lever 121 is provided at its lower surface with a guide pin 121a adapted to be guided along the cylindrical body of switch gear 119. At one side portion of the switch lever 121, a release actuating protrusion 121b is provided, which is operatively connected to the pivotal cassette housing 130.

On the other hand, the pivotal cassette housing 130 includes a pivotal bracket 131 pivotally mounted on opposite rear side portions of the fixed base plate 1, as shown in FIGS. 5 and 9. To the pivotal bracket 131, the cassette holder 132 is coupled, which guides the insertion of tape cassette.

A pair of arc guide slots 45 are formed at rear portions of opposite side walls 43 and 44 of the slide base 40, respectively. The arc guide slots 45 allow the cassette holder 132 of cassette housing 130 to move a predetermined distance, together with the slide base 40.

The pivotal bracket 131 is pivotally coupled to a pair of fixing members 133 and 134 fixedly mounted on opposite rear side portions of the fixed base plate 1, by means of pins 135, respectively. The pivotal bracket 131 is connected with the fixing members 133 and 134 by means of a pair of springs 136 and 137 so that it is always urged toward its opening position.

The pivotal bracket 131 has a pair of longitudinally extending guide slots 139 formed at respective rear portions of its opposite side walls 138 and a pair of inwardly extending guide pins 140 fixedly mounted to respective front portions of its opposite side walls 138. The cassette holder 132 has a pair of guide pins 142 fixedly mounted to respective rear portions of its opposite side walls 141 and received in respective guide slots 139 of the pivotal bracket 131 and respective guide slots 45 of the slide base 40. The cassette holder 132 also has a pair of guide slots 143 formed at respective front portions of its opposite side walls 141 and adapted to receive respective guide pins 140 of the pivotal bracket 131 therein. With these constructions, the cassette holder 132 can move longitudinally along the pivotal bracket 131.

Each guide slot 143 formed at the cassette holder 132 has at its one end a width larger than the diameter of the guide pin 140 of pivotal bracket 131 so that the cassette holder 132 can pivot about the rear guide pins 142 through a certain angle. For urging the cassette holder 132 downwardly, a plate spring 144 (FIG. 5) is connected between the pivotal bracket 131 and the cassette holder 132. A pair of plate springs 145 and 146 are also disposed at opposite side portions of the cassette holder 132, so as to urge the tape cassette downwardly.

A lock lever 147 is mounted on the front end of one side wall 138 of the pivotal bracket 131, to pivot about a pin 148 fixed to the pivotal bracket 131. The lock lever 147 is resiliently supported by a torsion spring 149 coupled to the pin 148.

The lock lever 147 has at its lower portion an engaging portion 147a engaged with a lock pin 150 fixed to the fixed base plate 1 and a release portion 147b operatively connected to the release actuating protrusion 121b of the switch lever 121.

A damper 152 with a damper gear 151 is fixedly mounted to the inner surface of one side wall of the cassette holder 132. At one side wall of the slide base 40, a sector gear 153 is formed, which is engaged with the damper gear 151 of damper 152, so as to make the pivoting of cassette housing 130 smooth.

Figure 22:
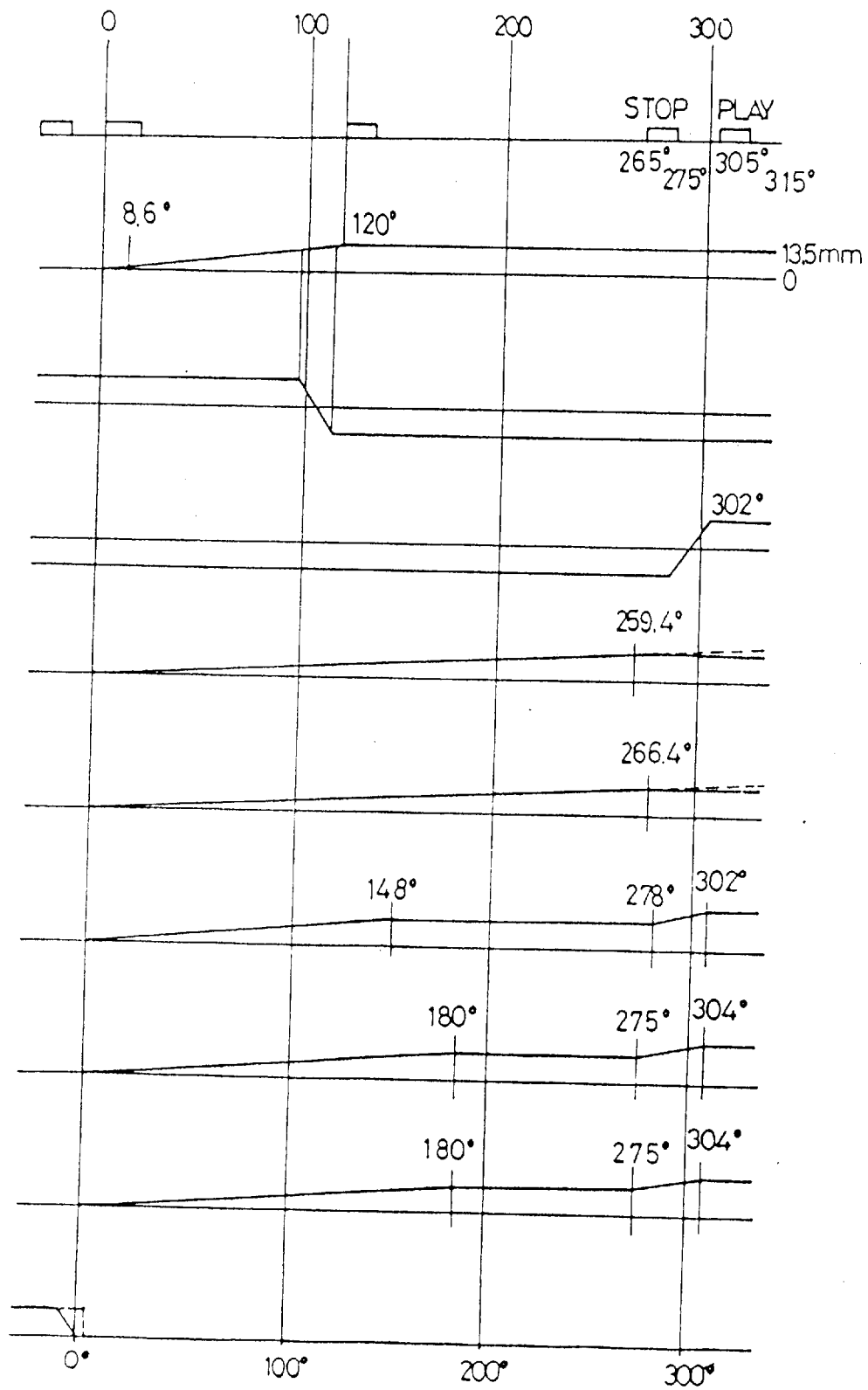

Referring to FIG. 22, there is illustrated operational relationships among rotational elements of the tape travelling system of deck mechanism according to the present invention, which elements rotate through an angle range of 0° to 315° during operations from the start of the cassette loading mode to the start of the playback mode. Through the operations, the slide base 40 moves 13.5 mm. The take-up brake 65 does not brake the take-up reel table 47 at the initial part of the tape loading operation, but generate a brake force when the loading operation is in progress. The supply brake 63 continues its braking operation for the supply reel table 46 until the tape loading operation is completed and releases its brake force when the playback operation is in progress. On the other hand, the supply and take-up slant post assemblies 4 and 5 are positioned at their pressing positions when the loading operation is completed. The tension post 52 is positioned at a predetermined position upon the completion of loading operation. The pinch roller 20 and the take-up post 21 pivot through the same angle.

The operation diagram of FIG. 22 is only for the illustrative purpose In practice, the operations may be varied, depending on functions and effects to be accomplished.

Operations of the deck mechanism with the above-mentioned constructions according to the present invention will be described, in conjunction with FIG. 22.

Figure 7:
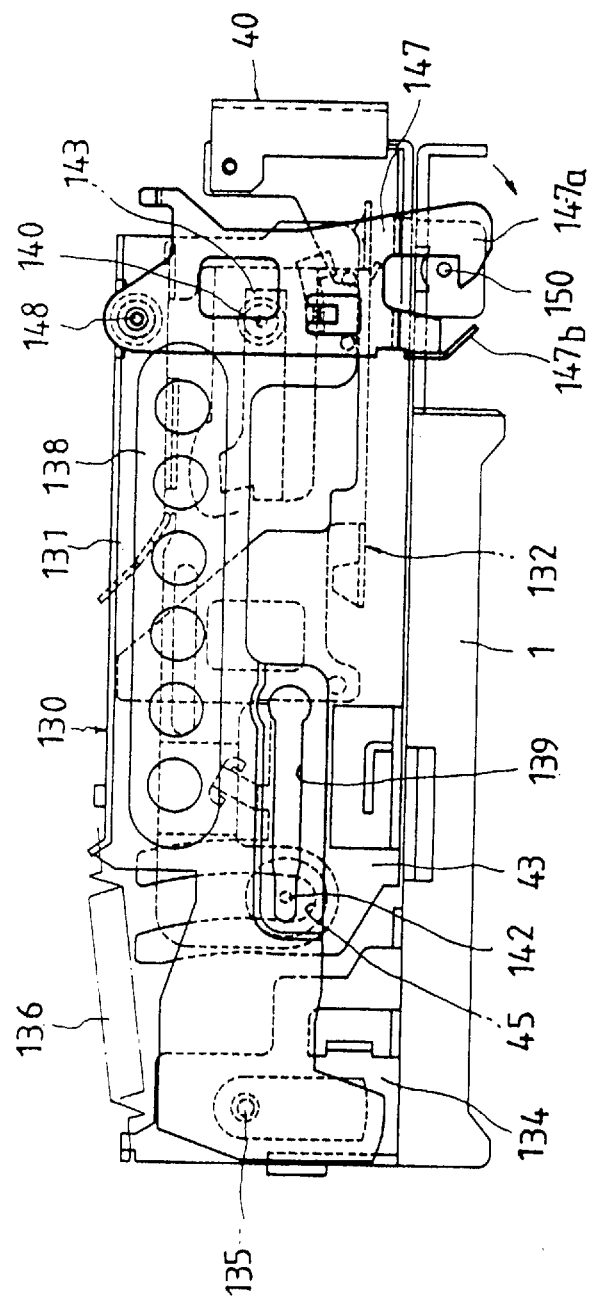

When an eject button of the deck body is pushed down from the state shown in FIGS. 1, 5 and 7, for an operation of the magnetic recording and reproducing apparatus with the deck mechanism of the present invention, the loading motor 3 drives in a normal direction. By the drive force from the loading motor 3 transmitted via the power transmission system, the switch lever 121 of the sensing means shown in FIG. 21 pivots and pushes the lock lever 147, so that the lock lever 147 pivots in counter-clockwise against the resilient force of the torsion spring 149. As a result, the engaging portion 147a of lock lever 147 is disengaged from the lock pin 150 of fixed base plate 1, thereby causing the pivotal cassette housing 130 to pivot about the pin 135 in a counter-clockwise, by virtue of the resilient forces of springs 136 and 137. Accordingly, the pivotal cassette housing 130 is positioned at its opened position, as shown in FIGS. 6 and 8.

As the loading motor 3 then drives in a reverse direction, the switch lever 121 is released from its locked state and pivots for its locking operation. Then, a tape cassette is inserted into the cassette holder 132 of cassette housing 130. The cassette housing 130 is then moved to its closed position, by pivoting the pivotal bracket 131. Accordingly, the engaging portion 147a of lock lever 147 can be engaged with the lock pin 150 of fixed base plate 1.

When the pivotal cassette housing 130 is slightly pushed down after the insertion of the tape cassette into the cassette holder 132 at the state that the cassette housing 130 is opened, as shown in FIGS. 6 and 8, the lock lever 147 of cassette housing 130 is engaged with the lock pin 150 of fixed base plate 1. Accordingly, the cassette housing 130 is maintained at its closed position in the deck body.

At this time, the tape cassette is stably supported by the plate springs 145 and 146 (FIG. 5) mounted on opposite side portions of the cassette holder 132.

According to the pivotal movement of the cassette housing 130, the release portion 147b of lock lever 147 actuates the release actuating protrusion 121b of switch lever 121. As a result, a slide movement of the slide base 40 and a tape loading operation can be carried out, by the driving of the motor 40.

That is, the drive force from the loading motor 3 is transmitted to the power transmission system at the state of FIGS. 1 and 21, thereby causing the loading gears 95 and 96 to rotate. By the rotation of loading gear 95, the slide base-driving cam lever 97 whose cam pin 97a is received in the cam groove 95a of loading gear 95 pivots about the pin 97'. At this time, the slide base 40 slides rearwardly along the guide pins 42 fixed to the fixed base plate 1, since the engaging pin 97b of slide base-driving cam lever 97 is engaged in the cam hole 80a of slide cam 80. Thus, the tape loading operation is completed, as shown in FIG. 3.

By the slide movement of slide base 40, the cassette holder 132 moves rearwardly a distance corresponding to the length of each guide slot 139 of the pivotal bracket 131 while being resiliently supported by the plate spring 144 disposed between the cassette holder 132 and the pivotal bracket 131, so that it is maintained at a state shown in FIGS. 7 and 9. The movement of cassette holder 132 is accomplished, in that the guide pins 142 of cassette holder 132 is engaged in the guide slots 45 formed at opposite side walls of the slide base 40, respectively.

Simultaneously with the slide movement of slide base 40, the supply and take-up slant post assemblies 4 and 5 move rearwardly along the loading guide holes 10 and 11 of the fixed base plate 1 while taking a tape out of the tape cassette.

When the tape loading operation is carried out by the slide movement of slide base 40 from the state of FIG. 1 to the state of FIG. 3, respective operations of the pinch roller arm driving and pressing means, the tension adjusting means, the brake means and the head cleaning means are simultaneously carried out in a continued manner. Now, each operation will be described in detail.

First, the operation of pinch roller arm driving and pressing means will be described. As shown in FIGS. 1 and 10, the pinch arm 22 is maintained at a state that its pivotal movement is restrained by the base 13 of take-up slant post assembly 5 until the loading operation for the tape cassette is initiated, although it is subjected to a rotation force in clockwise from the torsion spring 27.

When the slant post assembly 5 moves rearwardly from its front position, namely, from the state of FIG. 1 to the state of FIG. 3, as it receives the drive force from the loading motor via the power transmission system, the pinch arm 22 (FIG. 10) pivots in clockwise by virtue of the resilient force of torsion spring 27. By the continued movement of slant post assembly 5, the pinch arm 22 is separated from the slant post assembly 5, so that the engaging pin 23a of actuating arm 23 is engaged in the engaging groove 28a of cam lever 28. Thereafter, the cam lever 28 whose cam pin 28b is received in the cam groove 96a of loading gear 96 pivots through a predetermined angle according to the continued rotation of loading gear 96, thereby causing the pinch roller 20 of pinch arm 22 to come into contact with the capstan shaft 8 of capstan motor 7. As a result, the pivotal movement of pinch arm 22 is restrained. Under this condition, the tension spring 24 connected to the pinch arm 22 begins to generate a tension by a further rotation of loading gear 96. The tension is transmitted to the pinch roller 20, so that the pinch roller 20 can be pressed against the capstan shaft 8 under a proper pressure.

At this time, the take-up arm 25 resiliently connected to the pinch arm 22 pivots by the pivotal movement of pinch arm 22 and is then stopped when the movement of pinch roller 20 is completed, so as to guide the travelling of tape.

In the case of tension adjusting means, the contact protrusion 55a of tension arm 55 is in contact with the supply slant post assembly 4 until the loading operation for the tape cassette is initiated, as shown in FIG. 1. As the loading gears 95 and 96 rotate by virtue of the drive force of loading motor 3 under the above-mentioned condition, the slant post assemblies 4 and 5 slides along the loading guide holes 10 and 11, respectively. As a result, the tension arm 55 pivots counter-clockwise by the movement of slant post assembly 4, since the contact protrusion 55a of tension arm 55 is in pressing contact with the base 12 of supply slant post assembly 4.

When an operation in a tape travelling mode such as the play mode is carried out under the condition that the loading operations of slant post assemblies 4 and 5 and tension arms 55 are completed, as shown in FIGS. 3 and 13B, the tension arm 55 pivots from a state indicated by the solid line to a state indicated by the phantom line and adjusts the tension of the tape, as shown in FIG. 13B. When an excessive tension is applied to the tape, a force applied to the tension post 52 by the tape increases, thereby causing the tension arm 55 to pivot in clockwise. Accordingly, the tension band 58 wound around the supply reel table 46 is released, so that a force of the supply reel table 46 for taking the tape therefrom decreases, thereby causing the tension of the tape to decrease.

Where the tension of tape is small, the force applied to the tension post 52 is reduced, thereby causing the tension arm 55 to pivot counter-clockwise. Accordingly, the tension arm 55 pulls the tension band 58 wound around the supply reel table 46, so that the force of supply reel table 46 for taking the tape therefrom increases, thereby causing the tension of tape to increase.

Thus, the tension adjusting means always maintains the tension of tape constant by changing the position of tension post 52 according to the level of the tension applied to the tape and thus adjusting the rotation force of supply reel table 46.

In the case of brake means, its supply brake 63 is subjected to the resilient force of torsion spring 66 until the tape loading operation is completed, as shown in FIG. 1. Therefore, the gear portion 63a of supply brake 63 is engaged with the reel gear 48 of supply brake 63, so that the reel gear 48 can not freely rotate.

On the other hand, the take-up reel table 49 is not restrained by the brake lever 68 until the loading operation of slide base 40 is completed. Accordingly, the take-up reel table 49 can rotate, so as to enable an eject operation for the tape cassette by the movements of slant post assemblies 4 and 5.

When the loading operation of slide base 40 is subsequently completed, as shown in FIGS. 3, 14 and 15, the brake lever 68 of take-up brake 65 pivots about the pin 64 in clockwise. By the pivotal movement of brake lever 68, the engaging teeth 68a of brake lever 68 is engaged with the reel gear 49 of take-up reel table 47, so that the take-up reel table 47 operates while being subjected to a certain backward tension.

After the completion of the tape loading operation, the supply brake 63 pivots about the pin 62 in clockwise by the cam protrusion 119b of switch gear 119, so that it is disengaged from the reel gear 48 of supply reel table 46.

The brake means controls operations of the supply and take-up reel tables 46 and 47 in each mode, so as to achieve a smooth travel of the tape.

In the case of the head cleaning means, the cleaning roller 37 maintains a state that it is spaced apart from the head drum 2, until the loading operation for the tape cassette is initiated, as shown in FIGS. 1 and 12A.

When the loading operation is carried out, the slide base 40 slides, so that its extension 86 pushes the actuating arm 33, thereby causing the actuating arm 33 to pivot about the pin 32 in a counter-clockwise direction. By the pivotal movement of actuating arm 33, the cleaning lever 35 connected to the actuating arm 33 by the tension spring 36 pivots about the pin 34 in a counter-clockwise direction, thereby causing the cleaning roller 37 to come into contact with a head area of the head drum 2. When the tape loading operation is nearly completed, a protrusion 33a formed at the actuating arm 33 comes into contact with a contact portion 35a formed at the cleaning lever 35 and then pushes it, so that the cleaning lever 35 pivots further through a predetermined angle, thereby causing the cleaning roller 37 to be spaced away from the head drum 2.

Operations for reproducing video and audio signals recorded on the tape and recording signals and other operations are accomplished in a conventional manner.

As apparent from the above description, the present invention provides a deck mechanism wherein its fixed base plate and its slide base are slidably coupled to each other without defining a space therebetween. In accordance with the present invention, elements of a tape traveling system are arranged on upper and lower surface of the fixed base plate and the upper surface of the slide base. Accordingly, the deck mechanism of the present invention can be reduced in volume, total height and number of elements used, as compared with conventional deck mechanisms wherein its fixed base plate and its slide base are coupled to each other with a space therebetween and elements of a tape travelling system are arranged in the space and on the lower surface of a fixed base plate and the upper surface of a slide base. As a result, it is possible to provide products which are light, thin, simple and compact in construction and to reduce the manufacture cost.

In addition to the contribution to the compactness of products and the reduction in manufacture cost, the present invention makes it possible to simplify the overall construction and improve the ability in assembling, by mounting a printed circuit board bearing circuits such as an end sensor and a dew sensor on the fixed base plate, and forming supporting members for the tape cassette and fixing members for the central gear of the idler mechanism, integrally with the fixed base plate, by bending works. Consequently, the present invention contributes to an improvement in productivity.

Moreover, the deck mechanism of the present invention includes a single cam cover plate with a simple construction capable of preventing separations of loading gears and a rotor magnet of a capstan motor, reinforcing the strength of the fixed base plate and preventing a separation of the pinch roller-driving cam lever.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A deck mechanism for a magnetic recording and reproducing apparatus which records video and audio signals on a tape and reproduces them while making the tape come into contact with a rotary head drum and guides the tape along a tape travelling path defined by elements of a tape travelling system, comprising:

a fixed base plate fixedly mounted to a body case of the apparatus, said fixed base plate having an upper side surface and an opposite lower side surface on which various functional elements are arranged;

a slide base slidably resting on the upper side surface of the fixed base plate, to move rectilinearly between a tape cassette-ejecting position and a tape loading-ending position such that a level of the slide base relative to the fixed base plate remains constant as the slide base moves between the tape cassette-ejecting position and the tape loading-ending position, said slide base being in contact with the fixed base plate such that essentially no space exists between a lower side surface of said slide base and said upper side surface of said fixed base plate, said deck mechanism being free of any functional elements located between said lower side surface of said slide base and said upper side surface of said fixed base plate;

a cassette bracket for receiving a tape cassette therein;

pivot means for pivotally attaching said cassette bracket to said slide base;

a power transmission mechanism for transmitting a drive force from a loading motor to a gear portion of a tape loading means which is directly connected to supply and take-up slant post assemblies, said gear portion of said tape loading means being connected with a gear portion of the power transmission mechanism and connected with a rotation shaft of the loading motor, said power transmission mechanism being located at said opposite lower side surface of the fixed base plate; and slide base moving means for moving the slide base toward said rotary head drum upon a tape loading, said slide base moving means being directly operated by said gear portion of said tape loading means.

2. A deck mechanism for a magnetic recording and reproducing apparatus which records video and audio signals on a tape and reproduces them while making the tape come into contact with a rotary head drum and guides the tape along a tape travelling path defined by elements of a tape travelling system, comprising:

a fixed base plate fixedly mounted to a body case of the apparatus, said fixed base plate having an upper side surface and an opposite lower side surface on which various functional elements are arranged;

a slide base slidably mounted on the fixed base plate directly adjacent to said upper side surface, to move rectilinearly between a tape cassette-ejecting position and a tape loading-ending position such that a level of the slide base relative to the fixed base plate remains constant as the slide base moves between the tape cassette-ejecting position and the tape loading-ending position, said slide base directly being in contact with the fixed base plate such that substantially no space is defined between said slide base and said upper side surface of said fixed base plate;

a cassette bracket for receiving a tape cassette therein;

pivot means for pivotally attaching said cassette bracket to said slide base;

a power transmission mechanism for transmitting a drive force from a loading motor to a gear portion of a tape loading means which is directly connected to supply and take-up slant post assemblies, said gear portion of said tape loading means being connected with a gear portion of the power transmission mechanism and connected with a rotation shaft of the loading motor, said power transmission mechanism being located at said opposite lower side surface of the fixed base plate; and slide base moving means for moving the slide base toward said rotary head drum upon a tape loading, said slide base moving means being directly operated by said gear portion of said tape loading means.

3. The deck mechanism in accordance with claim 2, wherein there are no gears located between said slide base and said upper side surface of said fixed base plate.

4. The deck mechanism in accordance with claim 2, wherein there are no functional elements located between said slide base and said upper side surface of said fixed base plate.

5. The deck mechanism in accordance with claim 2, wherein the slide base has a pair of support pins adapted to support said cassette and fixedly mounted to opposite parts of a front upper surface portion of the slide base, respectively, and a pair of bent support portions formed integrally with opposite parts of a rear upper surface portion of the slide base, respectively, by a bending work.

6. The deck mechanism in accordance with claim 2, wherein the slide base has an elongated extension extending from one side portion of a rear end of the slide base and operatively connected with head cleaning means and a reinforcing member attached to the extension and having a step construction, a head cleaning roller of the head cleaning means is horizontally moved by a cleaning lever.

7. The deck mechanism in accordance with claim 2, wherein said deck mechanism is free of any gears located between said slide base and said upper side surface of said fixed base plate.

8. The deck mechanism in accordance with claim 2, wherein said deck mechanism is free of any functional elements located between said slide base and said upper side surface of said fixed base plate.

9. The deck mechanism in accordance with claim 2, wherein the fixed base plate is mounted with a cam cover plate comprising a planar body and a pair of engaging holes having sidewalls for inserting respective central shafts of two loading gears, each of the engaging holes having a large diameter receiving portion and a small diameter engaging portion and each of the central shafts having a small diameter engaging portion able to be freely received in the large diameter receiving portion of each corresponding engaging hole and adapted to be engaged in the small diameter engaging portion of each corresponding engaging hole in a manner such that each of the small diameter engaging portions of the central shafts slides from each of the large diameter receiving portions.

10. The deck mechanism in accordance with claim 9, wherein the planar body of the cam cover plate has at its one side edge a support member being of a bent construction with a step providing a horizontal support portion, the support member being adapted to prevent a separation of a capstan motor.

11. The deck mechanism in accordance with claim 9, wherein the planar body of the cam cover plate has at one side portion thereof an axial hole adapted to support a shaft supporting a pinch roller-driving cam lever and thus prevent a separation of the pinch roller-driving cam lever.

12. The deck mechanism in accordance with claim 9, wherein the planar body of the cam cover plate has at opposite side portions thereof a pair of support angle members, respectively, each of said support angle members being of a bent construction with a step providing a horizontal support portion fixedly mounted to one of opposite side portions of the lower side surface of the fixed base plate.

13. A deck mechanism in accordance with claim 12, wherein the support angle members are arranged in opposite sides of one of loading guide holes formed at the fixed base plate, to be spaced a certain distance apart from each other so that they reinforce a degradation in strength of the fixed base plate caused by the formation of the loading guide hole.

* * * * *